(12) United States Patent
Young

(10) Patent No.: US 11,998,951 B2
(45) Date of Patent: Jun. 4, 2024

(54) SLACK SEPARATION APPARATUS AND METHOD

(71) Applicant: ISHIDA EUROPE LIMITED, West Midlands (GB)

(72) Inventor: Kevin Young, Worcester (GB)

(73) Assignee: ISHIDA EUROPE LIMITED, Birmingham (GB)

(*) Notice: Subject to any disclaimer, the term of this patent is extended or adjusted under 35 U.S.C. 154(b) by 119 days.

(21) Appl. No.: 17/638,113

(22) PCT Filed: May 12, 2020

(86) PCT No.: PCT/GB2020/051156
§ 371 (c)(1),
(2) Date: Feb. 24, 2022

(87) PCT Pub. No.: WO2021/038183
PCT Pub. Date: Mar. 4, 2021

(65) Prior Publication Data
US 2022/0288642 A1 Sep. 15, 2022

(30) Foreign Application Priority Data
Aug. 27, 2019 (GB) ...................... 1912242

(51) Int. Cl.
*B07B 13/04* (2006.01)
*B07B 1/06* (2006.01)
(Continued)

(52) U.S. Cl.
CPC ............... *B07B 13/04* (2013.01); *B07B 1/06* (2013.01); *G01G 13/024* (2013.01); *G01G 19/393* (2013.01)

(58) Field of Classification Search
CPC ........... B07B 1/06; B07B 13/04; B07B 13/05; B07B 13/16; G01G 13/024; G01G 19/393
(Continued)

(56) References Cited

U.S. PATENT DOCUMENTS 3,108,949 A 10/1963 Fehlmann
3,172,588 A * 3/1965 Bertold ............... B29C 45/1769
225/2
(Continued)

FOREIGN PATENT DOCUMENTS

DE 33 09 932 A1 9/1984
EP 0 811 431 A1 12/1997
(Continued)

OTHER PUBLICATIONS

First Office Action issued in corresponding Chinese Patent Application No. 2020800606621 dated Feb. 7, 2023, with English translation thereof.
(Continued)

Primary Examiner — Joseph C Rodriguez
(74) Attorney, Agent, or Firm — SQUIRE PATTON BOGGS (US) LLP

(57) ABSTRACT

A dispersion feeder for distributing a product stream to a plurality of receiving devices arranged about the periphery of the dispersion feeder, the dispersion feeder comprising a dispersion table; wherein the dispersion table comprises: a product receiving region at the centre of the dispersion table configured to receive a product stream comprising product and slack, and a product dispensing region surrounding the product receiving region; wherein the dispersion table is configured to transfer the product radially from the product receiving region to the product dispensing region; characterised in that the dispersion table further comprises: one or more apertures extending through the dispersion table, the
(Continued)

one or more apertures being positioned between the product receiving region and the product dispensing region.

22 Claims, 10 Drawing Sheets

(51) Int. Cl.
*G01G 13/02* (2006.01)
*G01G 19/393* (2006.01)

(58) Field of Classification Search
USPC .......................................................... 209/680
See application file for complete search history.

(56) References Cited

U.S. PATENT DOCUMENTS

| | | | | |
|---|---|---|---|---|
| 3,394,804 A | * | 7/1968 | Reichel | A47L 21/02 |
| | | | | 209/920 |
| 3,997,058 A | * | 12/1976 | Greer | B07C 5/06 |
| | | | | 209/660 |
| 4,138,017 A | * | 2/1979 | Itoh | B07B 13/04 |
| | | | | 209/680 |
| 4,155,840 A | | 5/1979 | Gauld et al. | |
| 4,588,091 A | * | 5/1986 | Wade | G01N 5/00 |
| | | | | 209/680 |
| 2015/0174617 A1 | | 6/2015 | Sickinger et al. | |
| 2015/0266211 A1 | * | 9/2015 | Wolfgang | B33Y 40/20 |
| | | | | 425/424 |
| 2015/0367350 A1 | * | 12/2015 | Münkel | B02C 7/02 |
| | | | | 241/246 |

FOREIGN PATENT DOCUMENTS

| | | |
|---|---|---|
| GB | 349 481 A | 5/1931 |
| JP | 2002-177936 A | 6/2002 |
| NL | 1 016 972 C2 | 6/2002 |
| SU | 946688 A1 | 7/1982 |

OTHER PUBLICATIONS

Combined Search and Examination Report for Great Britain application No. GB 1912242.3, 7 pages dated Jan. 10, 2020.
International Search Report and Written Opinion for International Application No. PCT/GB2020/051156, 18 pages, dated Jul. 30, 2020.

* cited by examiner

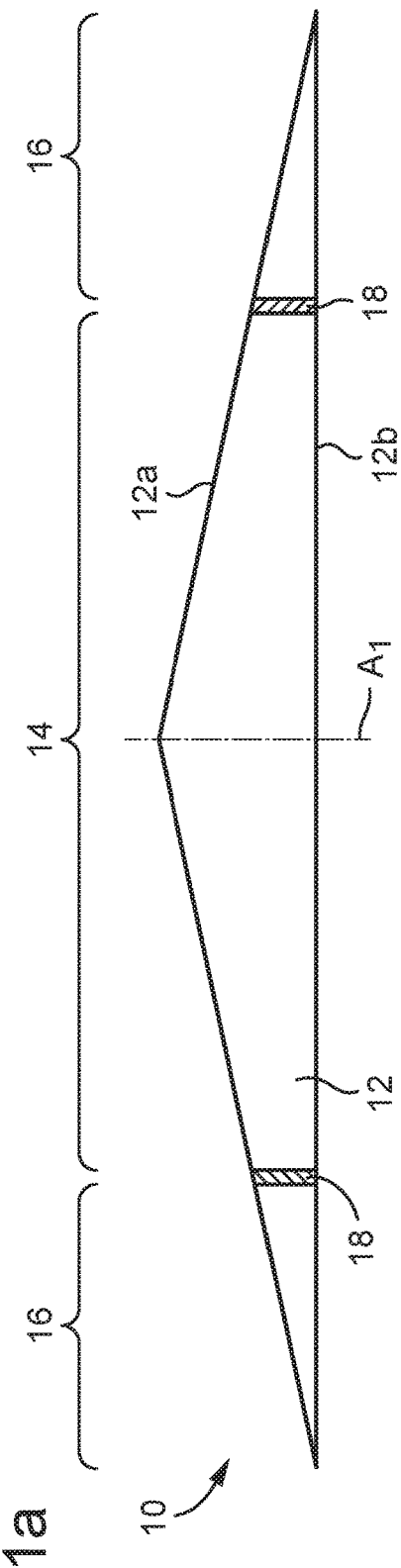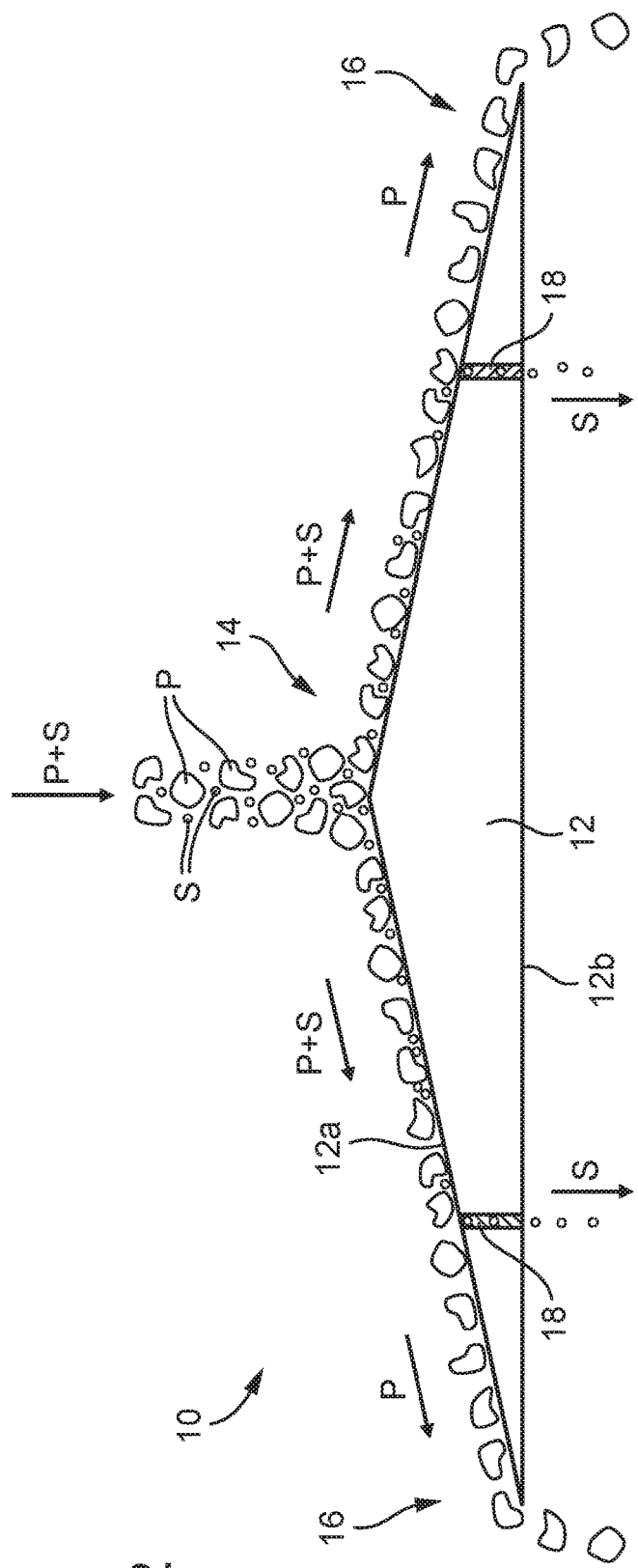

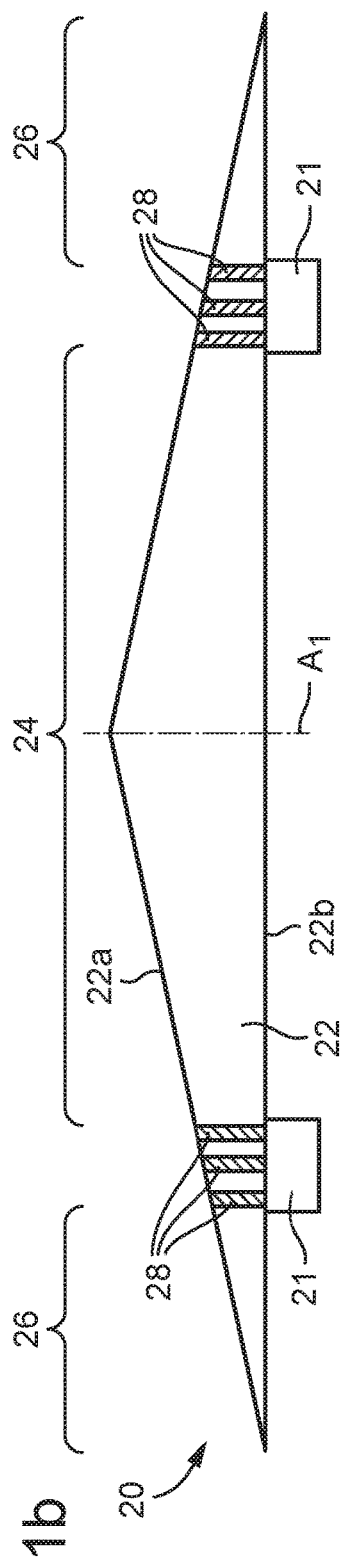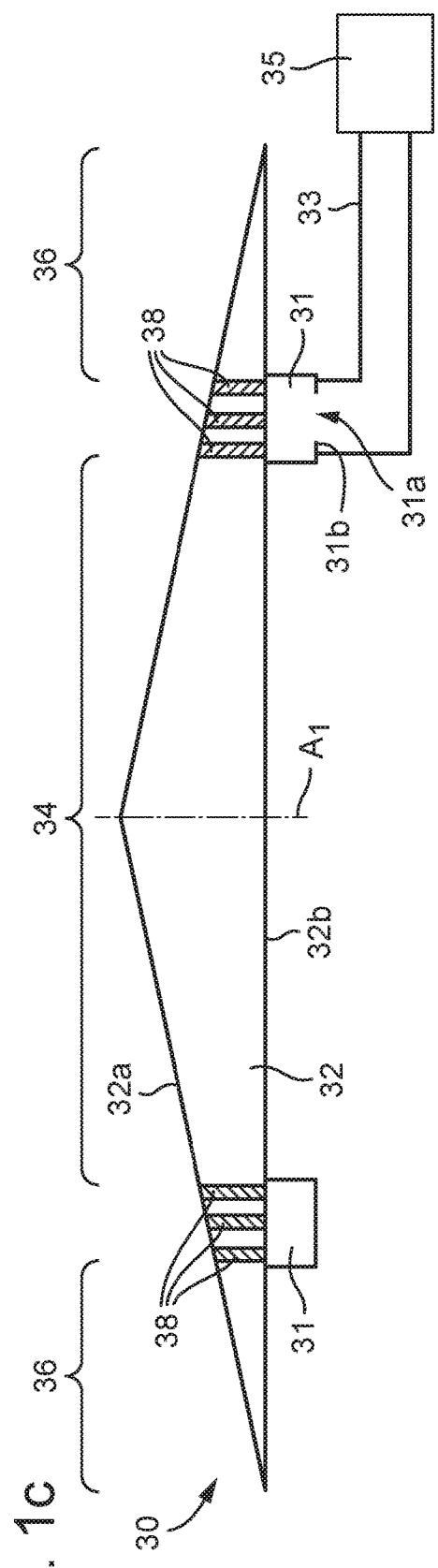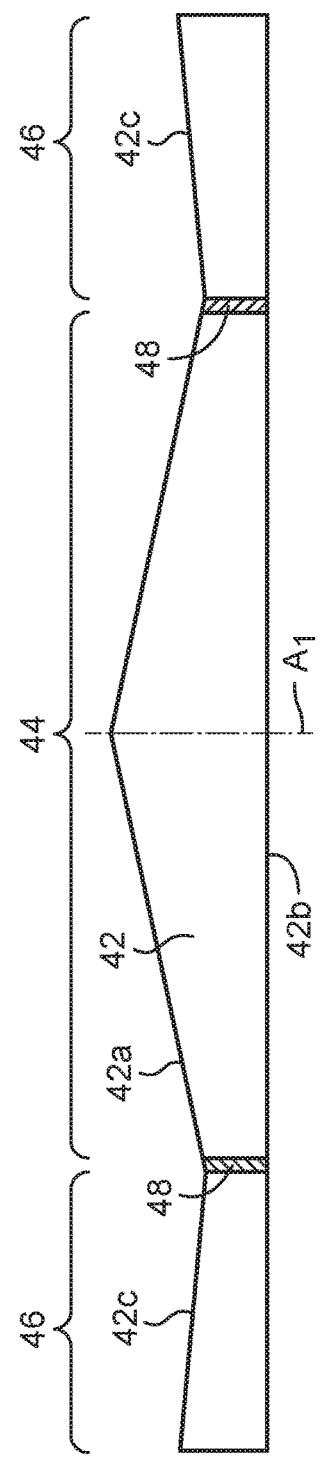

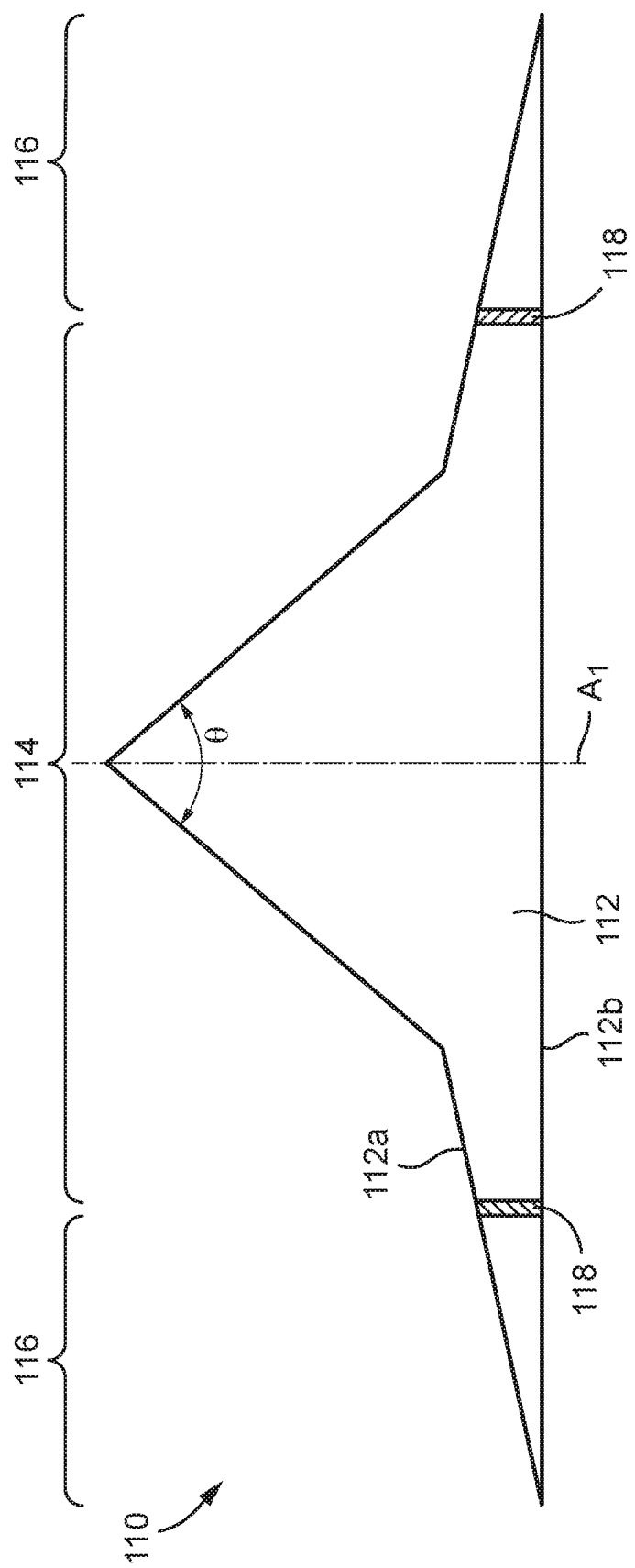

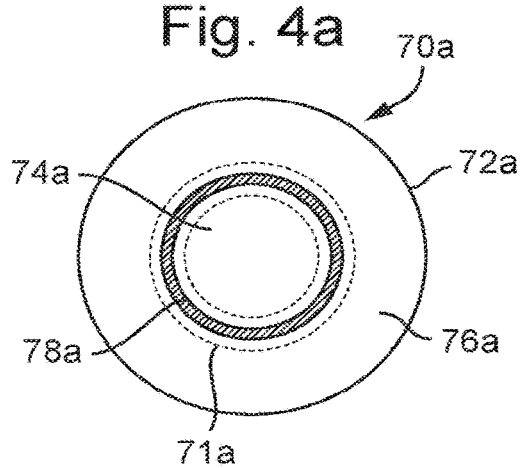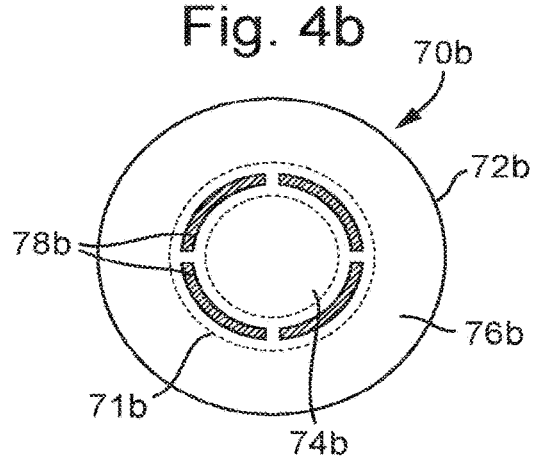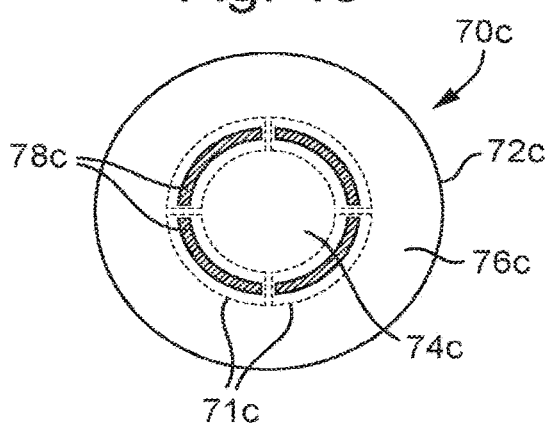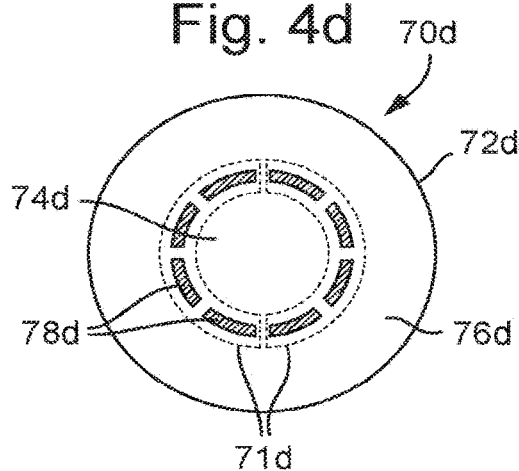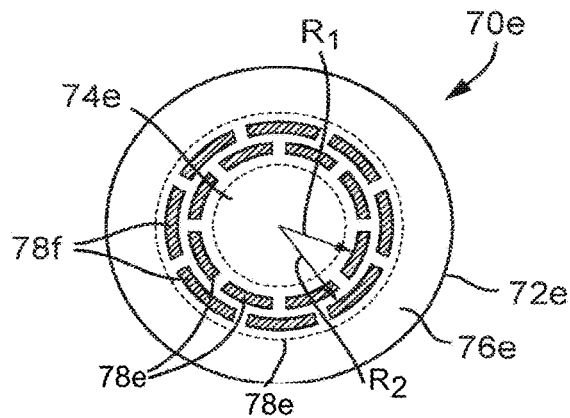

SLACK SEPARATION APPARATUS AND METHOD

CROSS-REFERENCE TO RELATED APPLICATIONS

The present application is a national-stage filing under 37 USC 371(c) of International Application No. PCT/GB2020/051156, filed May 12, 2020, which claims the benefit and priority of European Patent Application No. EP1912242.3, filed on Aug. 27, 2019, the entire contents of each of which are herein incorporated by reference in their entirety for all purposes.

FIELD

The present disclosure relates to devices and methods for separating excess slack out from a product stream comprising a mixture of product and slack. For example, the slack could be a food product coating such as sugar for sugared sweets, breadcrumbs for breaded product or seasoning for savoury snacks.

More specifically, aspects of the invention relate to an improved dispersion feeder which efficiently and conveniently separates slack from a product stream, systems comprising said dispersion feeder, and a method of separating slack from a product stream using said dispersion feeder.

BACKGROUND

Some products are packaged together with additional material, which will be referred to herein as slack. Slack, which is generally of a substantially solid or liquid form, may be mixed with solid product before the mixture is portioned into packaging. Where slack is substantially solid, its dimensions are typically at least an order of magnitude smaller than the dimensions of the product itself. For example, the slack may be in the form of powder or particulates.

Such slack may be included to protect the product in some way, for example from degradation due to exposure to certain chemicals or due to motion of the product within its packaging. Alternatively or additionally, slack may be included to enhance the product in some way, for example food products may be provided with loose coatings of sugar, breadcrumbs or herbs to improve one or more of their taste, texture, appearance or smell. Alternatively or additionally, slack may be created during processing of a product before packaging, for instance, products such as potato chips or crisps may crumble or break to form slack.

In some processes, for example coating processes, it may be necessary to mix a higher ratio of slack to product than is desired in the final packaged product, for example to ensure an even coating can be achieved. However, this presents a problem of how to separate excess slack from the product before packaging.

For some products it is not desirable for excess slack to be allowed to float freely within the packaging. For example if excess breadcrumbs are floating in the packaging of a breaded food product intended for oven cooking then that excess slack could end up burning on to the oven tray. Separation of excess slack prior to packaging helps to solve these problems.

A further problem can arise where a mixture of product and slack is dropped into packaging, which is subsequently sealed towards its upper end. If the slack falls at a slower rate than the product, for example where the product is a jelly sweet and the slack is a sugar coating, the seal quality may be compromised by slack trapped within the seal. The sealing step can be delayed to allow the slack to settle before sealing so as to reduce the occurrence of this problem, but this approach slows processing speed and reduces output of packaged products.

Equally, excess slack may collect in or adhere to product handling machinery.

This may result in the machinery jamming. Equally, where the product is a food product, slack which is stuck in machinery for long periods may spoil or attract pests, thereby causing potential dangers to public health.

US 2015/0174617 A1 describes a device for separating slack from a product stream within a system comprising a combination weigher. Slits which separate slack from product are provided in feeder troughs of a combination weighing device. Once separated, the slack is transported outward from the feeder troughs by separation grooves to a circular reservoir (i.e. a rotatable collection ring) which surrounds the outside of the combination weigher. This reservoir rotates around the combination weigher to transport the slack contained within past a suction nozzle so that the slack may be removed.

Disadvantages of the device of US 2015/0174617 A1 include that it is physically very large, extending around the outside of a combination weigher. In addition, the device restricts access to the combination weigher and therefore complicates inspection and maintenance. Furthermore, continually rotating the reservoir involves significant amounts of energy.

Therefore, there is a need for an alternative method and/or apparatus for separating excess slack from product streams, which preferably contributes to solving one or more of the problems discussed above.

SUMMARY

The claimed invention provides improved devices, systems and methods for removing slack from a product stream. As discussed above, slack will be understood herein as being either a liquid, or a solid with dimensions that are significantly smaller than the product with which it is mixed (e.g. having an average dimension that is at least five or ten times smaller than the average dimension of the product).

The devices, systems and method in accordance with the invention are particularly well suited for removing slack from mixtures that contain food products—for example coated food products such as sugared sweets or candies, flavoured crisps and chips, bread crumbed products and marinated meats.

According to an aspect of the invention there is provided:
a dispersion feeder for distributing a product stream to a plurality of receiving devices arranged about the periphery of the dispersion feeder, the dispersion feeder comprising a dispersion table;
wherein the dispersion table comprises:
a product receiving region at the centre of the dispersion table configured to receive a product stream comprising product and slack, and a product dispensing region surrounding the product receiving region;
wherein the dispersion table is configured to transfer the product radially from the product receiving region to the product dispensing region;
characterised in that the dispersion table further comprises:

one or more apertures extending through the dispersion table, the one or more apertures being positioned between the product receiving region and the product dispensing region.

Dispersion feeders typically receive a single input product stream, and are controlled to convey the product radially outwards from this region, whilst dispersing the product equally or substantially equally circumferentially. Dispersion feeders are typically provided upstream of (for instance) weighing devices, and their main function is to enable a product stream to be divided into roughly equal portions. These roughly equal portions are collected (for instance in feeder troughs or weigh hoppers), and then may be weighed and combined by a weighing device to provide final product portions with highly accurate weights. Alternatively, the product output from a dispersion feeder may be processed in a variety of other manners.

In devices according to the claimed invention, slack may be separated from a product stream via the apertures as the product passes or travels across a surface of the dispersion table (i.e. a product supporting surface of the dispersion table). Thus slack may be removed immediately from the product stream after it is delivered to the dispersion table, for instance, by a conveyor.

This is particularly beneficial since the product may experience a significant drop or fall onto the dispersion table. This drop may create substantial amounts of slack. Thus the claimed invention significantly reduces the amount of slack shortly after its creation, preventing slack from passing downstream from the dispersion table. As such, the present invention offers significant benefit over existing systems which either remove slack before it is provided to the dispersion table (and therefore do not separate slack created at the dispersion table), or downstream of the dispersion table (which allow slack created at the dispersion table to enter the machinery before it reaches the existing slack removal system).

By reducing the amount of slack which travels downstream the claimed invention improves packaged product quality (e.g. by reducing the proportion of slack in a packaged product, and avoiding poor package seals) and increases product output (e.g. by reducing the settling time when packaging products, avoiding machinery jams and minimising impact on normal inspection and maintenance regimes). Indeed, the dispersion feeders discussed above can significantly improve the quality of a packaged product since the dispersion feeders are commonly arranged to output a product stream to a packaging machines (either directly or via an intermediate component such as a weighing device). As such, the dispersion feeders can remove slack from a product stream shortly before the product stream is packaged.

The claimed invention is particularly space efficient. By providing apertures through a dispersion table slack is separated from a product stream without the need for additional components outside which extend outwards beyond the boundaries of conventional dispersion feeders. As such, dispersion feeders according to the claimed invention may be used in place of or retrofitted to existing machinery. Furthermore, as mentioned above the claimed invention does not restrict access to the dispersion feeder or other machinery, and thereby reduces slack without complicating maintenance or inspection operations.

The compact size and low weight of the dispersion feeders discussed herein is particularly important because in food production (and other fields) dispersion feeders are typically mounted above (i.e. is positioned over) a weighing device that the dispersion feeder feeds. In turn the weighing device may be positioned over and feed a packaging machine (e.g. a bagmaker, traysealer or cartoniser). As such, dispersion feeders may be installed at relatively large heights within a factory (e.g. 3 to 5 metres above ground level). Reducing the size and weight of a dispersion feeder significantly reduces the difficulty of handling, installing and maintaining a dispersion feeder.

In the claimed invention a single input product stream may be received centrally at a product receiving region of the table and then be evenly distributed between a plurality of receiving devices arranged around (e.g. circumferentially around) the dispersion feeder. Once the product reaches the product dispensing region, which is preferably at the outside edge or periphery of the dispersion table, the product may be dispensed to receiving devices by, for instance, falling off the edge of the dispersion table.

In embodiments where the dispersion table is circular (as is preferred), the product receiving region may be a region at the centre of the dispersion table and the product dispensing region may be located concentrically around the product receiving region. In these cases the product dispensing region may be an annulus at the periphery or edge of the dispersion table.

The product receiving region and product dispensing region may be adjacent or adjoining such that the apertures are located at or define (at least a portion of) the boundary between the product receiving region and product dispensing region. Alternatively, the product dispensing region may be laterally offset from the product receiving region such that the apertures are located in a portion of the dispersion table separating the product dispensing region from the product receiving region.

The claimed apertures may extend through the dispersion table from a product supporting surface of the table across which the product is transported or transferred (i.e. the product supporting surface faces upwards in use) to a reverse surface which faces downwards in use. The apertures are preferably sized to separate slack from product—i.e. the apertures may be sized such that slack but not product may pass through or fall through them in use.

Preferably the dispersion feeder comprises table drive means. The table drive means may be configured to move the dispersion table—e.g. to cause a change in position and/or orientation of the dispersion table. Driving the dispersion table in this manner preferably causes product on the dispersion table to be transferred from the product receiving region to the product dispensing region as the dispersion feeder moves. The table drive means may be configured to control the dispersion table and the movement of the dispersion table in a variety of manners.

For instance, the table drive means may be configured to rotate the dispersion table—i.e. in some preferred examples the table drive means is table rotation means configured to rotate the dispersion table. Such examples of table drive means which rotate is particularly well suited to sticky products (e.g. raw meat).

A table rotation means may rotate the dispersion table about an axis substantially perpendicular to the radial direction in which the dispersion table extends and along which the product is transferred. This axis may be substantially central within the dispersion table. The table rotation means may be an electric motor.

Furthermore, the table rotation means may be configured to rotate the dispersion table in a single direction—e.g. such that the dispersion table is rotated solely or continuously in the clockwise or anticlockwise direction. Alternatively, the table rotation means may be configured to rotate the dispersion table alternately in opposing directions. In other words, the table rotation means may be configured to rotate the dispersion table first clockwise and then anticlockwise, and then repeat this sequence such that the table rotates in a reciprocating manner. The clockwise and anticlockwise rotations in these alternating examples may be in a range from 180 degrees (i.e. half of a rotation) to 1080 degrees (i.e. three rotations).

In particularly preferred embodiments the table drive means is table vibration means configured to vibrate the dispersion table—i.e. the dispersion feeder comprises table vibration means configured to vibrate the dispersion table. Therefore, by controlling the vibration means the dispersion table may be controlled to transfer product from the product receiving region to the product dispensing region. As the dispersion table is subject to mechanical vibration, product supported by the dispersion table will be continually shifted, and will travel radially outward from the product receiving region such that the product travels across or over the apertures.

In preferred embodiments, the table vibration means is configured to vertically and/or circumferentially vibrate the dispersion table. By vertical vibration it will be understood that the table vibration means may be configured to reciprocally translate the dispersion table along a substantially vertical axis—e.g. the centre axis of the dispersion table. Under circumferential vibration the table vibration means may be configured to reciprocally rotate the dispersion table about the centre axis of the dispersion table. Such vibrations have been found to be particularly successful at removing slack. However, other vibration motions (e.g. linear) may also be used.

In preferable examples the dispersion table is at least circumferentially (i.e. rotationally) vibrated. In this case, product supported on a surface of the dispersion table will be prompted to travel both radially and circumferentially from the product receiving region. As such, under circumferential vibration products will travel increased distances across the surface of the dispersion table, crossing an increased number of apertures on average. This increases the amount of slack which will be separated from the product stream. Furthermore, circumferential vibration may more evenly distribute the product dispensed by the dispersion feeder since product is prompted to spread out both circumferentially and radially under the vibration.

In some examples the table vibration means may be configured to vibrate (i.e. reciprocate or oscillate) the dispersion table in a circumferential manner wherein in a forward direction (in which product and slack is to be conveyed circumferentially around the dispersion table) the movement of the dispersion table slower than the movement of the dispersion table in the reverse direction. In use, during the relatively slow forward stroke product and slack supported on the dispersion table is carried circumferentially forward by the dispersion table contained in the drum is carried forward by the drum. The frictional force between the product stream and the dispersion table means that the dispersion table and mixture move forward together. In contrast, during the relatively quick backward stroke the dispersion table applies significantly more forces to the product stream supported thereon. Consequently, the frictional forces between the dispersion table and a mixture of product and slack are overcome, and the mixture remains in place as the drum moves quickly backwards beneath the mixture. Therefore, in use, during each cycle product and slack supported by the dispersion table are conveyed a small distance circumferentially around the drum in the direction of the forward stroke. Alternatively, the table vibration means may be configured to vibrate the dispersion table in an alternative manner such that product and slack moves in a circumferential direction.

Combining circumferential and vertical vibration further increases the proportion of slack that may be removed from a product stream. In these examples the table vibration means may be configured to drive the dispersion table in a twisting or screwing manner —such that the dispersion table may be simultaneously reciprocally rotated about its centre axis and reciprocally translated in a substantially vertical direction (e.g. along the centre axis in examples where the centre axis is substantial vertical). The twisting or screwing motion formed by simultaneously vertically and circumferentially vibrating the dispersion table is particularly successful at causing product and slack to move circumferentially about the centre axis of the dispersion table since the product and slack tends to jump or skip circumferentially across the dispersion table as it is translated upwards by the vertical vibration and laterally by the circumferential vibration.

In these examples product will remain on the dispersion table for a relatively long time as it is motivated to move in a circumferential direction around the centre axis of the dispersion table. For instance, on average a product may be conveyed around the centre axis of the dispersion table one or more times before it is discharged from the edge of the dispersion table. In other words the dwell time of product on the dispersion table may be increased. Therefore, slack which travels with the product in a product stream is more likely to encounter an aperture and be separated from the product stream. Hence, dispersion feeders in which the table vibration means is configured to apply both vertical and circumferential vibration to the dispersion table are particularly successful at removing slack from a product stream.

Product which is supplied to a dispersion table that is circumferentially vibrated, or circumferentially and vertically, will also tend to travel (relatively slowly) in a radial direction under centrifugal forces caused by the circumferential vibration. Therefore, product will tend to move radially from the product receiving region of the dispersion table to the product dispensing region under at least circumferential vibration. Therefore, a product stream may be dispensed or discharged from the dispersion table even if the table has a relatively flat or shallow product supporting surface. Therefore, dispersion tables in dispersion feeders configured to circumferentially vibrate the dispersion table may be relatively shallow (i.e. less tall), reducing the size and weight of the dispersion feeder. The reduction in size and weight of the dispersion feeder allows the feeder to be more easily installed and maintained.

Preferably the vibration may have a frequency of greater than 5 Hz, preferably greater than 10 Hz, more preferably greater than 30 Hz. For instance, the table vibration means may be configured to circumferentially vibrate the dispersion table wherein the frequency of vibration is in the range 10 to 100 Hz, more preferably 30 to 70 Hz.

Additionally, or alternatively, the table vibration means may be configured to circumferentially vibrate the dispersion table wherein the amplitude of the vibration at the periphery of the dispersion table is from 0.1 mm to 8 mm circumferentially, preferably from 0.5 mm to 6 mm circumferentially, more preferably approximately 2 mm to 4 mm.

Additionally, or alternatively, the table vibration means may be configured to circumferentially vibrate the dispersion table wherein amplitude of vibration is from 0.1 degrees to 2 degrees angularly, and preferably from 0.2 degrees to 1 degree angularly.

In further examples the table vibration means may be configured to circumferentially and/or vertically vibrate the dispersion table with an amplitude from 0.1 mm to 5 mm, and with a frequency from 10 Hz to 60 Hz.

Alternative vibration parameters may be more suitable for transferring a product stream across a dispersion table when using specific combinations of product and slack, different forms of vibration (e.g. vertical vibration rather than circumferential vibration) and/or specific dispersion table geometries.

Furthermore, it will be readily appreciated that a table drive mechanism is not essential, and additional or alternative means of controlling the product stream may be provided. For instance, a dispersion table may comprise a steep slope from the product receiving region to the product dispensing region (e.g. the product supporting surface may be highly convex) such that the product may flow naturally across the dispersion table under gravity. Alternatively or additionally a feeder device may be provided with other drive mechanisms such as screws which push product across the dispersion table, such that the product travels from the product receiving region to the product dispensing region.

In preferred embodiments, the one or more apertures are located such that there is at least one aperture along at least half of the radial directions extending from the product receiving region to the product receiving region, wherein preferably there is at least one aperture along at least three quarters of the radial directions, more preferably there is at least one aperture along substantially all of the radial directions. Portions of the dispersion table along some radial directions which are not provided with apertures may be required structurally, so as to connect or join the product receiving portion to the product dispensing portion.

As the proportion of the product receiving region which is radially surrounded by apertures increases, the product stream travelling outward from the product receiving region will increasingly travel across at least one aperture. Consequently, the proportion of slack which may be separated or removed from the product stream by the apertures is increased.

For instance, where the dispersion device is circular, the lateral extents of the apertures may define (at least part of) an annulus located between the product receiving region and the product dispensing region.

Such an annulus may be defined by a plurality of apertures located at different radial positions relative to the product receiving region or the centre of the dispersion table. As such the product receiving region may be surrounded by aperture(s) in each radial direction. However, gaps between the apertures at different radial positions may provide structural support to the dispersion table, connecting the product receiving region to the product dispensing region of the table.

The one or more apertures may extend through from 5% to 50% of the product supporting surface—i.e. 5% to 50% of the product supporting surface may be voids defined by the aperture(s). Preferably the one or more apertures extend through at least 5% of the product supporting surface, more preferably at least 10%. More preferably the apertures extend through less than 50% of the product supporting surface, more preferably less than 25%. Having said this in further examples alternative layouts of the one or more may be provided.

Increasing the proportion of the dispersion table that the one or more apertures extend through may, in use, increase the amount of slack removed from a product stream via the apertures. However, reducing the proportion of the dispersion table through which the aperture(s) extend increases the strength of a dispersion table allowing the dimensions and weight of the dispersion table to be reduced. As such the dispersion table may be more easily installed and maintained, and may have a longer working lifespan.

Dispersion feeders which comprise a dispersion table having one or more apertures that extend through less than 50% of the product supporting surface of the dispersion table, and a table vibration means configured to vibrate the dispersion table in at least the circumferential direction may provide a dispersion table that is both highly effective at removing slack and that is easy to handle and maintain.

Preferably, one or more slack receiving containers are arranged to receive slack which has passed through the one or more apertures. These slack receiving containers store the separated slack and prevent slack which has been separated from a product stream from re-entering the production line. In use the slack receiving containers may directly underlie the apertures.

As such, the slack receiving containers may be provided under the dispersion table. By under it may be understood that the slack receiving containers are provided below the dispersion table in a direction extending from a product supporting surface of the table to an opposing, reverse surface of the table. In other words, the or each slack receiving container may be arranged adjacent to the reverse surface of the table. Providing one or more slack receiving containers that are arranged adjacent to the reverse surface of the table may minimise the space required for the dispersion feeder.

Furthermore, reducing the height of the slack receiving containers (i.e. the dimension of the slack receiving containers in the vertical direction) may reduce the amount of slack generated by the product stream as it moves downstream from the dispersion feeder. Reducing the height of the slack receiving container allows the distance between the product dispensing region of the dispersion table and any downstream equipment (e.g. a weighing device or packaging machine) that the dispersion feeder is arranged above. Reducing this distance may, in use, reduce the distance product must fall between the dispersion feeder to the downstream equipment. Hence, the forces experienced by the product as it hits the downstream equipment are reduced, and the product is less likely to be damaged or break apart in this fall creating slack. Hence, the amount of slack generated downstream of the dispersion feeder as product falls to the downstream equipment) may be reduced. This is especially important when handling coated food products, where a coating may only be adhered loosely to the surface of the product and may be easily dislodged (thereby creating slack) if the coated food product experiences high forces.

Where slack is a product coating such as sugar for sugared sweets or seasoning for chips or crisps, the excess and unused slack may be returned from the slack receiving containers to an earlier stage in the production line. Therefore, slack receiving containers may help avoid unnecessary waste.

Alternatively, the separated slack may not be collected or contained after it passes through the apertures, and could be collected periodically from the ground or other surface beneath the dispersion table. However, care must be taken to ensure that the separated slack does not unexpectedly re-enter the production line.

In some embodiments the dispersion feeder comprises a single slack receiving container, wherein the periphery of the single slack receiving container extends around the peripheries of all of the one or more apertures. In other words, the lateral extent of the single slack receiving container encloses the lateral extents of each of the apertures in the radial plane in which the dispersion table extends. Therefore, all (or substantially all) of the slack which passes through the one or more apertures is received within the single slack receiving container.

Alternatively, the dispersion feeder may comprise a plurality of slack receiving containers each arranged to receive slack which has passed through a respective subset of the one or more apertures. As such different apertures of the one or more apertures in the dispersion table feed different slack receiving containers. For instance, where the dispersion table is circular, multiple slack receiving containers may be arranged under the dispersion table at regular intervals around the circumference of the table.

A single slack receiving container may be preferred in comparison to embodiments with multiple slack receiving containers since the process and/or components for emptying a single slack receiving container may be simpler than removing slack from multiple containers.

Advantageously, the or each slack receiving container is fixed relative to the dispersion table (i.e. it cannot move or rotate relative to the table). In preferred examples the slack receiving container(s) may be fixed or rigidly connected to the dispersion table (e.g. to a reverse surface of the dispersion table). Therefore, motion (e.g. vibration) applied to the dispersion table by the table drive means may be transferred to the slack receiving container(s) and vice versa. However, this is not essential.

Preferably the or each slack receiving container comprises an extraction point through which slack may be removed. Thus, after slack has entered the slack receiving container via the one or more apertures, it may be removed through a separate extraction point, thereby emptying the slack receiving container. As such, slack may be removed from the slack receiving container in situ—i.e. without moving the slack receiving container relative to the dispersion table, or moving the dispersion table or dispersion feeder as whole relative to other machinery located upstream or downstream. This avoids any interruption of the passage of product stream across the dispersion feeder.

Most preferably there is provided a single slack receiving container, with a single extraction point. This minimises the space required for the storage and removal of slack, and simplifies the removal and collection of slack. A smaller dispersion feeder may be easier to install and maintain. Moreover, reducing the space required below the dispersion table to storing and remove slack may allow the dispersion feeder to be brought closer to any underlying equipment (e.g. a weighing device), such that any vertical drop experienced by product between the dispersion feeder and the underlying equipment is reduced. Thus the amount of slack generated downstream of the dispersion feeder by such a drop can be reduced.

However, as mentioned above, the dispersion feeder may alternatively comprise a plurality of slack receiving containers each with a respective extraction point. Alternatively, a given slack receiving container may comprise two or more extraction points.

The extraction point(s) may extend through a wall of the slack receiving container(s). The extraction point(s) is preferably located in or near a base surface of the slack receiving container and/or at or near the lowest point of the slack receiving container when in use so that substantially all of the slack within the slack receiving container may be drained or removed from the container quickly and easily.

Such extraction points offer a convenient means of removing slack from slack receiving containers. As such, preferably each slack receiving container comprises at least one extraction point. However, in alternative embodiments, emptying a slack receiving container could involve separating the slack receiving container from the dispersion feeder and/or removing slack via the apertures in the dispersion table.

In some embodiments a base surface of the at least one slack receiving container is inclined towards the extraction point such that slack is collected toward the extraction point. As such, slack may empty or drain from the slack receiving container under gravity and without, for instance, human interaction. In some preferred embodiments each slack receiving container comprises a base surface and an extraction point, wherein the base surface is inclined towards the respective extraction point such that slack collects toward the respective extraction point.

Although, slack receiving containers with sloped base surfaces may drain under gravity and without human interaction they are relatively spatially inefficient.

Slack receiving containers from which slack may drain under gravity may require a relatively large angle (e.g. greater than 30 degrees) between the base surface of the slack receiving container and the horizontal plane in order to allow slack to flow along the surfaces without building up and creating a clog or jam. Such an angled base surface increases the height of the slack receiving container (e.g. the distance between the reverse or underside surface of the dispersion table and the lowest point of the slack receiving container) when compared to a slack receiving container with a horizontal or substantially horizontal base surface.

Relatively tall slack receiving containers with angled base surfaces are particularly problematic where the dispersion feeder must be mounted above other equipment (e.g. installed above a weighing device and a packaging machine as commonly occurs in fields such as the manufacture and packaging of food products). Having slack receiving containers that are relatively tall (i.e. having a large height) may increase the distance between the product supporting surface of the dispersion table and any downstream equipment below of the dispersion table. Therefore, the physical drop experienced by product supplied from the product dispensing region to the downstream equipment is increased. Therefore, slack generated downstream of the dispersion table may be increased as products are exposed to greater forces after they are dispensed.

Moreover, increasing the size of slack receiving containers increases the size and weight of a dispersion feeder as a whole. Thus dispersion feeders which comprise slack receiving containers with angled bases may be more difficult to install and maintain, especially when installed above further product handling equipment.

Therefore, in some cases it may be preferred to provide further means to, in use, remove slack from the slack receiving container. These means may allow the angle between the base surface of the slack receiving container and the horizontal to be reduced or avoided, such that the dispersion table may be positioned closer to downstream equipment and the size of the dispersion feeder may be reduced.

For instance, in preferred embodiments the slack receiving container may comprise a base surface arranged at an angle of less than 30 degrees relative to the horizontal, more preferably less than 20 degrees, more preferably still less than 10 degrees. In further preferred embodiments the slack receiving container may comprise a base surface that is horizontal or that is substantially horizontal. However, this is not essential and in further examples slack receiving containers may comprise base surfaces arranged at angles greater than 45 degrees.

In preferred examples, the height of a slack receiving container is less than 0.5 times the diameter or width of the dispersion table, more preferably less than 0.3 times the diameter or width of the dispersion table, more preferably still less than 0.15 times the diameter or width of the dispersion table. As mentioned above, by the height of the slack receiving container may be understood as the distance between the reverse or underside surface of the dispersion table and the point of the slack receiving container furthest from the dispersion table (i.e. furthest in a direction parallel to the centre axis of the dispersion table). In some embodiments the slack receiving container may comprise a height that is less than 0.5 m, more preferably less than 0.3 m, more preferably still less than 0.15 m.

In these examples, the product supporting surface of the dispersion table may be mounted closer to any underlying downstream equipment such that any vertical drop between the dispersion table and the underlying downstream equipment is reduced and the slack generated after product is dispensed form the dispersion feeder is reduced.

In particularly preferred examples, the dispersion feeder may comprise a vacuum pump connected to the extraction point for removing slack from the at least one slack receiving container. Therefore slack may be removed or emptied from the slack receiving container automatically and without human interaction. The vacuum pump may be configured to operate continuously or periodically so as to prevent excessive accumulation of slack within the slack receiving container. In embodiments having multiple slack receiving containers a vacuum pump may be connected to each extraction point such that all slack receiving containers may be emptied automatically. However, manufacture and operation of the device may be simplified if the dispersion feeder comprises a single slack receiving container configured to be emptied by a single vacuum pump.

Removing slack from the one or more slack receiving containers through the suction applied by a vacuum pump allows the slack receiving containers to be effectively and automatically emptied from shallow slack receiving containers—e.g. from slack receiving containers with base surfaces that are substantially horizontal or are arranged at relatively small angles to the horizontal plane. Hence the height of the slack receiving containers and the dispersion feeder as a whole may be reduced. This offers the benefits that slack generated downstream of the dispersion feeder is reduced and the dispersion feeder is easier to handle.

Alternatively or additionally, the extraction part may be closed with a plug or gate. The plug or gate may be opened periodically such that slack may be removed from the slack receiving container.

In further embodiments the dispersion feeder may further comprise container vibration means configured to vibrate the at least one slack receiving container so as to transfer slack contained therein to the extraction point. As such, slack within the slack receiving container will be prompted to travel or move across a base surface of the slack receiving container such that it may be removed through the extraction point, e.g. manually, under gravity or using a vacuum pump. Thus, slack is conveyed to the extraction point.

In embodiments having multiple slack receiving containers the vibration means may be configured to vibrate each of the slack receiving containers.

Operating a container vibration means (e.g. an vibrating or reciprocating motor) to convey slack through the slack receiving container(s) to an extraction point may allow slack to be quickly and effectively emptied (i.e. without the slack accumulating or forming clogs or jams) from a wide variety of slack receiving containers. Providing container vibration means may allow the size of slack receiving containers to be reduced without impacting the ability for slack to be removed from these containers. For instance, slack receiving containers may comprise a base surface that is substantially horizontal or that is arranged at a relatively low angle relative to the horizontal plane (e.g. less than 30 degrees, more preferably less than 20 degrees). Therefore, as discussed above, slack generated downstream of such dispersion feeders may be reduced and the dispersion feeders may be easier to install and maintain.

Embodiments which include both a vacuum pump and container vibration means are particularly preferable since the vibration means may be controlled to transfer the slack towards the extraction point, from where the vacuum pump may remove the slack from the slack receiving container. This allows for the suction of the vacuum pump to be reduced, thereby reducing the energy requirements of the dispersion feeder. Moreover, the dimensions (such as the height) of a slack receiving container may be further reduced.

Preferably the container vibration means is configured to vertically and/or circumferentially vibrate the slack receiving container.

Under circumferential vibration slack will move along the slack receiving container circumferentially. Therefore, at least circumferentially vibrating a slack receiving container is particularly preferred when the slack receiving container extends in a circumferential direction (e.g. when the slack receiving container is annular or arcuate, extending around the centre axis of a circular dispersion table).

The circumferential movement of slack within the slack receiving container as the slack receiving container is at least circumferentially vibrated may occur where a base surface of the slack receiving container is horizontal or substantially horizontal. Therefore, the height of the slack receiving container may be reduced without affecting the removal of slack from the slack receiving container. As a result the dispersion feeder may be made smaller (simplifying installation and maintenance) and the dispersion table may be mounted closer to a piece of downstream equipment that the dispersion feeder overlies and feeds (such that reduced levels of slack may be created when product falls from the dispersion table to the downstream equipment is reduced).

In particularly preferred embodiments the dispersion feeder comprises: an annular slack receiving container that extends around a centre axis of the dispersion table, wherein the annular slack receiving container comprises a single extraction point through which slack may be removed and a container vibrating means configured to circumferentially vibrate (or circumferentially and vertically vibrate) the slack receiving container such that, in use, slack within the slack receiving container is conveyed continuously around the slack receiving container in a circumferential direction. Therefore, regardless of where the slack enters the slack receiving container (i.e. regardless of which aperture slack passes through) it will move circumferentially around the slack receiving container to the extraction point. At the extraction point slack may be removed—e.g. using a vacuum pump, under gravity or manually. Hence, an annular slack receiving container may be emptied via a single extraction point when the slack receiving container is vibrated in at least the circumferential direction by the container vibration means. Therefore, slack may be automatically conveyed large distances along an annular slack collection reservoir and removed via a single extraction point without human interaction or an angled base surface. These embodiments offers a simple and space efficient means of removing slack (e.g. for recycling or reuse) that is separated from a product stream using the dispersion tables discussed above.

In further examples, the dispersion feeder may comprise at least one arcuate slack collection container (i.e. a slack collection container that extends circumferentially about a section of the circumference of a dispersion table), and a container vibration means configured to circumferentially vibrate the slack collection reservoir such that, in use, slack within the slack collection reservoir is conveyed circumferentially towards a first end of the slack collection reservoir. The slack collection container may comprise an extraction point at the first end of the arcuate slack collection reservoir. Hence regardless of where slack enters the arcuate slack collection container the slack will be conveyed circumferentially towards the first end of the slack collection container and the extraction point positioned there. Therefore, slack may be automatically conveyed large distances through an arcuate slack collection reservoir and removed via a single extraction point without human interaction or an angled base surface.

Preferably the container vibration means is configured to vertically and circumferentially vibrate the slack receiving container. In these examples the table vibration means may be configured to drive the slack receiving container(s) in a twisting or screwing manner — such that the slack receiving container(s) table may be simultaneously reciprocally rotated about the centre axis of the dispersion table and reciprocally translated in a substantially vertical direction (e.g. along the centre axis of the dispersion table in examples where the centre axis of the dispersion table is substantial vertical). Simultaneously vibrating the slack receiving container in the vertical and circumferential directions is very effective at motivating or conveying slack in a circumferential direction about the centre of a dispersion table. This is because since the slack is motivated to skip or bounce circumferentially across the base surface of the slack receiving container under the combined forces applied in the vertical direction by the vertical vibration and in the circumferential direction by the circumferential vibration. Hence, in use, frictional forces between the slack receiving container and slack contained within the slack receiving container are reduced. Therefore, a container vibration means that is configured to simultaneously circumferentially and vertically vibrate the slack receiving container reduces the risk of slack accumulating to form a clog or jam and as a result reduces maintenance and cleaning requirements of the dispersion feeder.

In particularly, preferred embodiments the container vibration means is the table vibration means such that the at least one slack receiving container and the dispersion table vibrate together. This may occur where the slack receiving containers are fixed relative to the dispersion table such that the slack receiving container may not translate or rotate relative to the dispersion table (and vice versa). The use of a single vibration means for both the dispersion table and the slack receiving container(s) simplifies the construction of the dispersion feeder, reducing the risk of mechanical failure and requiring less space than separate table and container vibration means. The benefits of reducing the size of the dispersion feeder as a whole are discussed in detail above. Furthermore, since in use the slack receiving container and slack contained therein is relatively light in comparison to the dispersion table and product thereon, the increases in capability and energy use of the vibration means required to efficiently collect slack are minimal.

For instance, in use, slack may be motivated to travel in a forward circumferential direction where the table vibration means (which may also be the table vibration means) is configured to reciprocally move the slack receiving container about a centre axis, wherein the movement of the slack receiving container in this in a forward circumferential direction is slower than the movement of the dispersion table in the reverse direction. During the relatively slow forward stroke slack may be carried forward by the base surface of the slack receiving container, whereas during the relatively quick reverse stroke the slack may remain in place as the slack receiving container moves quickly underneath the slack.

In some embodiments, the at least one slack receiving container may be rigidly connected to the dispersion table. In these examples, the physical connection between a single vibration means (i.e. a vibration means which vibrates both the dispersion table and one or more slack receiving containers) and the at least one slack receiving container and/or the dispersion table may be simplified since vibration forces may be transmitted between each of said slack receiving containers and the dispersion table.

Preferably the product receiving region is convex. Thus a point (or region of points) on the surface of the dispersion table within the product receiving region is higher than the periphery of the product receiving region. In such embodiments, the incoming product stream provided to the product receiving region will disperse under gravity, moving radially outwards and down a slope of the convex product receiving region, thus travelling towards the apertures and product dispensing region. This structural feature in the surface of the dispersion table may reduce or avoid the need for a table vibration means or other mechanical means of moving the product (dependent on the product involved). As such, the size and power requirements of the dispersion feeder may be reduced.

For instance, the product receiving region is preferably conical, having an apex at a (preferably central) point within the product receiving region and an inclined surface extending down towards the periphery of the product receiving region and the apertures. Alternatively, the product receiving region may be substantially hemispherical, having a semicircular or approximately semi-circular cross section in a radial plane. In further embodiments the product receiving region may have a sinusoidal cross section in a radial plane.

Preferably, at least part of the product dispensing region is higher than the region of the dispersion table in which the one or more apertures are located.

Therefore, as a product stream is transferred from apertures to the product dispensing region, the product must travel over a point or plurality of points on the dispersion table which are higher than the portion of the dispersion table in which the apertures are provided. By higher it may be understood that the at least part of the product dispensing region is above the apertures in a direction extending from a reverse surface of the dispersion table to the product supporting surface of the dispersion table. For instance, the dispersion table may comprise an inclined surface at the product dispensing region, or between the apertures and the product dispensing region wherein the inclined surface slopes down towards the apertures. Alternatively, the product supporting surface of the dispersion table may be stepped, such that it extends discontinuously in a radial direction.

Slack, which is typically small solid particles or a liquid, within a product stream is less likely than product to flow up an inclined slope or over a step in the surface of the dispersion table. In contrast, product will typically be pushed over such obstacles by subsequent products in the product stream.

As such, a piece of slack which is transferred as part of the product stream from the product receiving region towards the product dispensing region but is not separated by an aperture (e.g. because the piece of slack did not initially encounter an aperture when travelling from the product receiving region to the product dispensing region) is less likely to transferred across the product dispensing region and to receiving devices surrounding the dispersion feed. Instead slack is motivated to return to the portion of the dispersion device in which the apertures are provided.

Therefore, the piece of slack will tend to not be dispensed by the dispersion feeder and will instead be retained on the product supporting surface of the dispersion table (i.e. the dwell time of slack on the dispersion table is increased). This retained piece of slack will likely be subsequently separated in due course as it travels to an aperture (e.g. under vibration from the table vibration means, or when pushed by a product). Thus the proportion of slack removed from a product stream by the dispersion feeder is increased, since any individual piece or portion of slack is more likely to encounter an aperture and be separated from the product.

Preferably the one or more apertures are sized such that slack but not product may pass therethrough. In particularly preferred examples the minimum dimension of each of the one or more apertures is less than 0.5 cm, and preferably less than 0.25 cm. These sizes are well suited for dispersion feeders intended to be used with a variety of food products and their associated slack (e.g. sugared sweets and loose sugar, potato chips or crisps and excess seasoning, breaded products and loose breadcrumbs).

In preferred examples, the apertures may be of substantially any size or shape such that the product in the product stream that the dispersion feeder is intended to be used with may flow over the apertures without becoming stuck or wedged, whereas slack passes through the apertures. For instance, suitable aperture forms include slits, round or ovular holes, or the gaps in a mesh extending over a larger opening through the dispersion table.

Preferably the dispersion table is substantially circular. In other words, the surface of the dispersion table across which the product stream travels (i.e. a product supporting surface) is circular or approximately circular in plan view. As such, the dispersion feeder is well suited for use with traditional multihead weighers (also commonly called a combination weigher) which are symmetric about a central axis. The aperture(s) and/or slack receiving container(s) may be provided symmetrically around the central axis to simplify construction and ensure even distribution to receiving devices provided around the circumference of the dispersion table. Alternatively, the dispersion table may have another shape—being semi-circular, ovular, square, etc.—to match the necessary receiving units.

According to a further aspect of the invention there is provided a system comprising the dispersion feeder as discussed above, and a plurality of receiving devices arranged about the periphery of the dispersion feeder. This system offers similar benefits to the dispersion feeders discussed above since the receiving devices receive and output a product stream with reduced slack.

The receiving devices may comprise one or more troughs, such as vibrating troughs which may be used to transfer the product from the dispersion feeder to further devices such as hoppers. Alternatively or additionally, the receiving devices may comprise one or more hoppers, such as the weigh hopper or pool hopper of a multihead weigher. Alternatively or additionally the system may comprise further receiving devices such as conveyors.

The system preferably comprises a computer controlled weigher or volumetric feeder configured to receive product from the dispersion feeder, wherein preferably the computer controlled weigher is a multihead weigher (also commonly termed a combination weigher). The receiving devices discussed above may form part of the computer controlled weigher or volumetric feeder, or may feed the computer controlled weigher or volumetric feeder.

In further embodiments the system may comprise an alternative feed device downstream of the dispersion table such as a volumetric feeder or an alternative computer controlled weigher (CCW). Suitable CCWs include combination or multi-head weighers (as discussed above), screw fed weighers, cut gate weighers, linear weighers, and mix weighers. When used with the dispersion feeders discussed above these systems may accurately and quickly output portions of products with reduced slack.

The system may further comprise a packaging machine fed by such feed devices discussed above such as a bag maker, tray sealer, cartoniser or thermoformer. Consequently a product stream with a reduced proportion of slack may be fed into the appropriate receptacle within the packaging machine. The packaging machine may be configured to receive a product stream discharged from the dispersion feeder either directly from the dispersion feeder or indirectly via a weighing device (such as a CCW) or a volumetric feeder that is configured to receive the product stream discharged by the dispersion feeder.

In the systems discussed above, the dispersion feeder may be mounted above (i.e. vertically over) a weighing device such as a CCW or a volumetric feeder and/or over a packaging machine. For many products (and especially for coated products such as coated food products) it is preferable to minimise the vertical distance between the product dispensing region of the dispersion table and the weighing device or volumetric feeder so as to minimise slack created as product falls between the product dispensing region of the dispersion table and the downstream equipment. For instance, the dispersion feeder may be mounted adjacent to the downstream equipment.

According to a further aspect of the invention there is provided a method of separating slack from a product stream comprising product and slack using a dispersion feeder or system in accordance with the aspects discussed above, the method comprising:

- providing the product stream to a product receiving region at the centre of a dispersion table;
- controlling the dispersion table such that product is transferred radially from the product receiving region to a product dispensing region;
- wherein the dispersion table further comprises one or more apertures extending through the dispersion table, the one or more apertures being positioned between the product receiving region and the product dispensing region, such that as the product stream is transferred over the apertures slack passes through the one or more apertures and is separated from the product stream.

Preferably controlling the dispersion table comprises driving the dispersion table so as to cause the dispersion table to move. This movement (e.g. a change in position and/or orientation) preferably causes product on the dispersion table to be transferred to from the product receiving region to the product dispensing region.

In preferred examples controlling the dispersion table comprises vibrating the dispersion table vertically and/or circumferentially. This may increase the amount of slack which is separated from the product stream.

For instance, the dispersion table may be vibrated circumferentially wherein the frequency of vibration is in the range 10 to 100 Hz, more preferably 30 to 70 Hz. Furthermore the vibration may have a frequency of greater than 5 Hz, preferably greater than 10 Hz, more preferably greater than 30 Hz.

Additionally, or alternatively, the dispersion table may be vibrated circumferentially wherein the amplitude of the vibration at the periphery of the dispersion table is from 0.1 mm to 8 mm circumferentially, preferably from 0.5 mm to 6 mm circumferentially, more preferably approximately 2 mm to 4 mm.

Additionally, or alternatively, the dispersion table may be vibrated circumferentially wherein amplitude of vibration is from 0.1 degrees to 2 degrees angularly, and preferably from 0.2 degrees to 1 degree angularly.

The vibration discussed above may be performed using a table vibration means.

Alternatively, controlling the dispersion table may comprise rotating the dispersion table using table rotation means such as an electric motor (as discussed above).

Where the dispersion table comprises at least one slack receiving container arranged to receive slack which has passed through the one or more apertures, the method may further comprise the step of removing slack from the slack receiving container. The slack may be removed periodically or continuously.

Preferably removing slack from the slack receiving container comprises controlling a vacuum pump to remove slack from the slack receiving container. The vacuum pump may be operated continuously or periodically.

In preferred embodiments the method may further comprise the step of vibrating the slack receiving container vertically and/or circumferentially such that slack within the container is transferred towards an extraction point.

These methods offer corresponding benefits to the dispersion feeder and systems discussed above. In particular, methods in accordance with the invention significantly reduces the amount of slack which passes downstream from a dispersion table, thereby improving packaged product quality and increasing product output. In particularly, preferred embodiments this process does not interrupt the normal operation or maintenance and inspection of the dispersion feeder or any further machinery that it feeds or receives product from.

In some embodiments the method is a method of separating slack from a product stream comprising a food product and slack. The food product may be a coated food product such as sugared sweets or candies, flavoured crisps or chips, breaded food products and marinated meats.

It will be understood that the slack separated from the product stream using the methods, devices and systems discussed above is typically a liquid, or a solid having dimensions that are significantly smaller than the dimensions of its associated product. For instance the average dimension of slack may be at least 5 or at least 10 times smaller than the average dimension of the product.

BRIEF SUMMARY OF FIGURES

Embodiments of the invention will now be described with reference to the following figures:

FIGS. 1a to 1e show schematic sectional views of dispersion feeders in accordance with embodiments of the invention;

FIG. 2 shows a schematic sectional view of the dispersion feeder of FIG. 1a in use;

FIGS. 4a to 4e show schematic plan views of embodiments of dispersion feeders in accordance with the invention;

DETAILED DESCRIPTION

Figure 3:
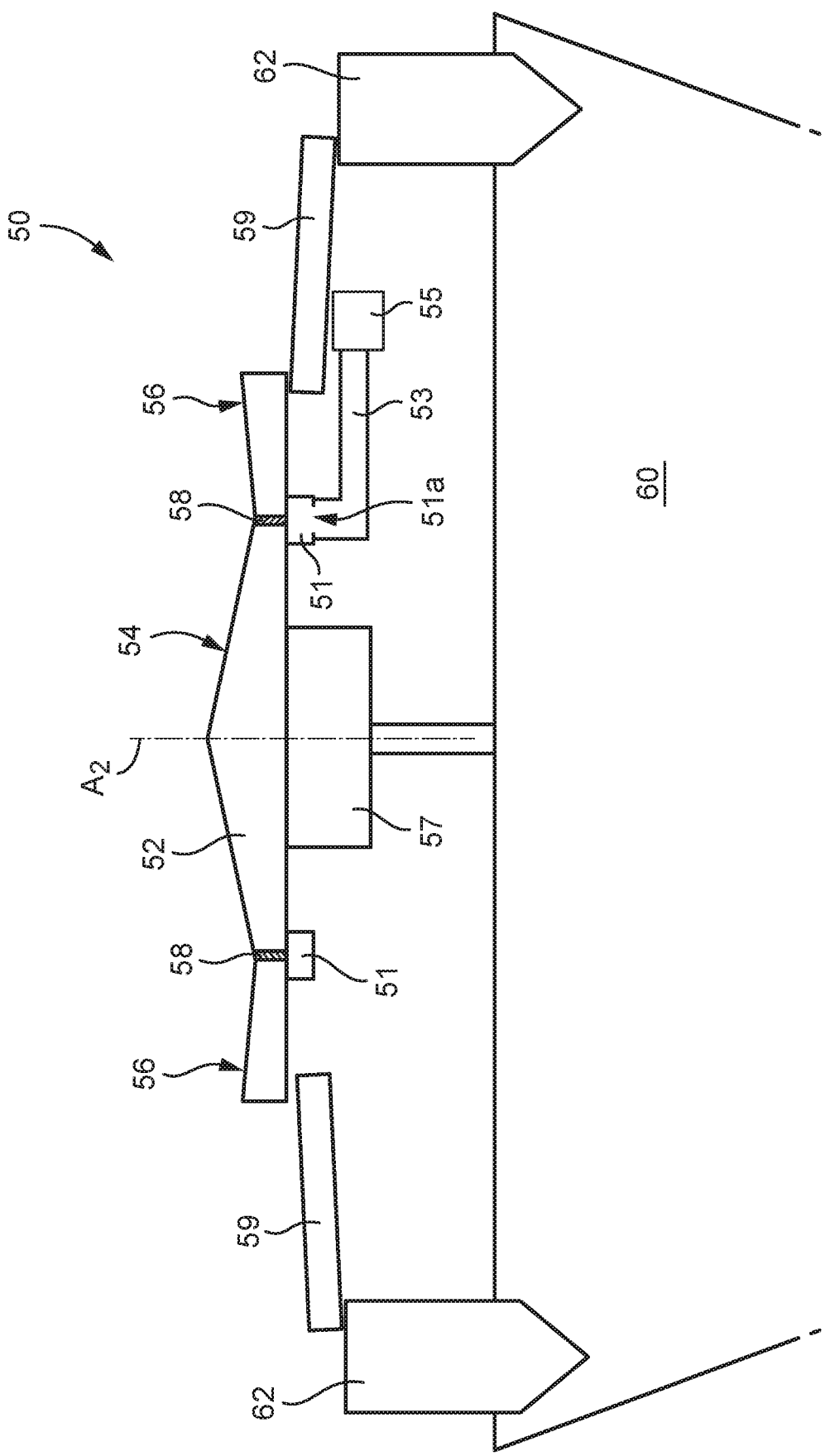
FIG. 3 shows a schematic sectional view of an embodiment of a system in accordance with the invention comprising a dispersion feeder.

FIGS. 1a to 1d show four examples of dispersion feeders 10, 20, 30, 40 suitable for separating slack from a product stream. The reference signs referring to corresponding features of each dispersion feeder are incremented by 10 in subsequent figures.

The first of these dispersion feeders 10, shown in cross section in FIG. 1a, comprises a dispersion table 12. The dispersion table 12—which is substantially circularly symmetric about a central axis $A_1$—has a product supporting surface 12a which is, in use, arranged to receive and support products thereon, and an opposing reverse surface 12b. The dispersion table is substantially conical, such that an apex is provided at the centre of the product receiving surface 12a, whereas the reverse surface 12b is substantially planar.

The dispersion table 12 further comprises apertures 18 extending through the dispersion table 12 from the product receiving surface 12a to the reverse surface 12b. The apertures 18 are located between the apex of the product receiving surface 12a and the periphery of the dispersion table 12 on either side of central axis $A_1$.

The dispersion table 12 comprises a product receiving region 14 and a product dispensing region 16.

The product receiving region 14 is located at a central portion of the dispersion table 12 at and/or near the apex of the product supporting region 12a. The product dispensing region 16 is located at the periphery of the dispersion table 12, and surrounds the product receiving region 14.

The apertures 18 are arranged between the product receiving region 14 and the product dispensing region 16. As such, the apertures 18 may be considered to define at least part of the boundary between the product receiving region 14 and the product dispensing region 16.

In use, product which is received at the product receiving region 14 may travel down the conical product supporting surface 12a—i.e. travelling radially outwards from the convex product receiving region 14 to the product dispensing region 16. As a product stream passes or travels across the apertures 18, slack may fall through the apertures 18 such that there is relatively less slack in the product stream which reaches the product dispensing region 16. This product stream with reduced amounts of slack which has reached the product dispensing region 16 will typically be dispensed over the radially outer edge (i.e. a periphery) of the dispersion table 12.

It should be noted that the removal of slack will be performed at the dispersion table 12 (rather than upstream or downstream of the dispersion table 12).

Furthermore, the removal of slack does not require any additional apparatus or space when compared to traditional dispersion feeders which lack any of the apertures 18 shown in FIG. 1a. Of course, additional slack removal means could be provided upstream and/or downstream of the dispersion table if desired.

FIG. 1b shows in cross section a further dispersion feeder 20, which again comprises a dispersion table 22. The dispersion table 22 of FIG. 1b shares many features and advantages with the dispersion table 12 of FIG. 1a.

In particular, the dispersion table 22 of FIG. 1b comprises a product supporting surface 22a, reverse surface 22b and a similar substantially conical geometry to the corresponding features in FIG. 1a.

However, the dispersion table 22 comprises a plurality of apertures 28 (specifically, three apertures 28) arranged between a product receiving region 24 and a product dispensing region 26 on each side of the central axis $A_1$ of the product supporting surface 22a. The apertures 28 each extend from the product supporting surface 22a to the reverse surface 22b through the dispersion table 22.

In use, the apertures 28 separate slack from a product stream travelling across the product supporting surface 22a from the product receiving region 24 to the product dispensing region 26. As a product stream is transferred across the apertures, slack will passes through the apertures 28, whereas product continues across the product supporting surface 22a.

The dispersion feeder 20 further comprises a slack receiving container 21 on either side of the central axis $A_1$ beneath the dispersion table 22. Where the dispersion table 22 is circular (as in preferred examples) the slack receiving containers 21 may form separate parts of a single, annular slack receiving container which extends circumferentially around the central axis $A_1$ of the dispersion feeder (however, this is not essential).

The slack receiving containers 21 are configured to receive slack which is separated from a product stream by the apertures 28. Each slack receiving container 21 is formed as a trough or channel with a substantially rectangular cross section (although other shapes are equally suitable) and is arranged beneath the apertures 28 on the respective side of the central axis $A_1$. As such, the lateral extent of each slack receiving container 21 in the radial direction perpendicular to the central axis $A_1$ is greater than (and encompasses) the lateral extents of the overlying apertures 28 in the radial direction. Consequently substantially all slack which passes through the apertures 28 from the product supporting surface 22a falls under gravity into the slack receiving container 21.

The slack receiving containers are adjacent to the reverse surface 22b of the dispersion table 22 (e.g. such that the side walls of the slack receiving containers 21 are adjacent or contact the reverse surface 22b) to reduce the risk that slack which has passed through the apertures 28 does not enter the slack receiving containers 21, but this is not essential.

The dispersion feeder 32 of FIG. 1c is identical to the dispersion feeder 22 of FIG. 1b with the exception that a slack receiving container 31 comprises an extraction point 31 in a base surface 31b of the slack receiving container 31 through which slack may be removed and the container 31 emptied. As shown, a suction pump 35 (i.e. a vacuum pump) is connected to the extraction point 31 via suction tube 33A. The suction pump 35 may be operated to apply a vacuum to the extraction point 31 and remove slack from the slack receiving container 31. As such, slack may be removed automatically via the extraction point 31.

FIG. 1d shows a further dispersion feeder 40 which is a modification of the dispersion feeder 10 shown in FIG. 1a.

As with the example shown in FIG. 1a, the dispersion feeder 40 comprises a dispersion table 42 having two opposed surfaces, a product supporting surface 42a and a reverse surface 42a, and is substantially symmetric about a central axis $A_1$. An aperture 48 extends through the dispersion table 42 on either side of the central axis $A_1$ between a product receiving region 44 and a product dispensing region 46. The product dispensing region 46 again surrounds the product receiving region 44.

As in FIG. 1a, the product supporting surface 42a of the dispersion table 42 comprises a conical portion extending between the apertures 48 and having an apex at the central axis $A_1$. As such, the product receiving portion is convex (i.e. conical).

However, the product supporting surface 42a comprises an inclined surface 42c extending from each aperture 48 to the periphery (i.e. radially outer edge) of the dispersion table 42. Each inclined surface 42c slopes downwards from the periphery of the dispersion table 42 towards the apertures 48. Hence, there is an inclined surface at the product dispensing region 46 which tends to feed slack which has passed from the product receiving region 44 to the product dispensing region 46 back towards the apertures 48.

Therefore, slack is less likely to be dispensed from the dispersion table 42. Instead, slack will tend to return to the portion of the dispersion table 42 in which the apertures 48 are provided (i.e. the slack will travel radially inwards from the portion dispensing region towards the apertures). In other words the dwell time of slack on the dispersion table 42 is increased. The result of this geometry is that slack is more likely to be removed from the product stream, since slack which returns towards the apertures is likely to encounter and fall through an aperture.

In contrast, product will tend to travel up the inclined surface 42c on either side of the dispersion table 42 since it is larger and therefore has greater momentum, and because a given product will be pushed up the slope by the subsequent products in the product stream. Nevertheless, the sloped surface 42c will also increase the dwell time of product on the dispersion table 42. Since product will spend relatively more time on the surface of the dispersion table there is a greater likelihood that any slack that is initially supported on top of a product stream or trapped within the bulk of a product stream may fall to the product supporting surface of the dispersion table 42 and be separated from the product stream via the apertures 48.

As a consequence, the dispersion table 42 shown in FIG. 1d may require fewer apertures 48 to remove equivalent amounts of slack from a product stream than the alternative dispersion tables 12, 22, 32 discussed above—i.e. the proportion of the surface of the dispersion table 42 through which apertures are provided may be reduced. This may simplify construction of the dispersion table 42 and increases its strength.

FIG. 1e shows a further example of a dispersion feeder 100 suitable for separating slack from a product stream. The reference signs referring to corresponding features of the dispersion feeder are incremented by 100 relative to the features of FIG. 1a.

As with the examples of FIGS. 1a to 1d discussed above, the dispersion feeder comprises a dispersion table 112 which is substantially symmetric about central axis $A_1$. The dispersion table 112 comprises a product supporting surface 112a which is, in use, arranged to receive and support products thereon, and an opposing reverse surface 112b.

The dispersion table 112 comprises apertures 118 extending through the dispersion table 112 from the product receiving surface 112a to the reverse surface 112b. The apertures 118 are provided between a product receiving region 114 at the centre of the dispersion table 118 and a product dispensing region 116 which surrounds the product receiving region 114.

The product receiving region 114 of the dispersion table 112 is conical, having an opening angle θ (i.e. the internal angle at the cone apex) of approximately 90 degrees. As will be seen, this product receiving region 114 is significantly steeper than the examples shown in FIGS. 1a to 1d (where the opening angle is approximately 150 degrees).

Dispersion tables which comprise a relatively steep product receiving region (such as the product receiving region 114 shown in FIG. 1e) are particularly well suited for use with sticky products such as raw meat. This is because sticky product may easily fall down the sloped surface of the product receiving region 114 so as to reach the product dispensing region 116 at the periphery of the dispersion table 112 and subsequently be dispensed.

For instance, although some dispersion tables according to the invention may have a planar product supporting surface, or a product supporting surface having a relatively shallow conical product receiving region with an opening angle of between 180 and 135 degrees, in other preferred examples a product receiving region may be conical and have an opening angle of less than 135 degrees. In further examples the product receiving region may be conical and have an opening angle of less than 100 degrees, more preferably less than 90 degrees. However, it will be appreciated that a wide variety of geometries may be used for dispersion tables.

Returning to the specific example of FIG. 1e the product supporting surface 112a of the dispersion table 112 further comprises a truncated conical section surrounding the product receiving region 112. As such, the product supporting surface 112a slopes downwards from the periphery of the product receiving region 114 to the periphery (or radial edge) of the dispersion table 112 where the product supporting surface 112a meets the opposing reverse surface 112b.

However, in further examples dispersion tables could comprise both a steep product receiving region 114 (as shown in FIG. 1e) and an inclined surface 42c which slopes down from the radially outer edge of the dispersion table towards the apertures (as shown in FIG. 1d).

The dispersion feeder 110 of FIG. 1e and other examples of dispersion tables with relatively steep product receiving regions provide particularly good results for sticky products when combined with a table rotation means configured to rotate the dispersion table and dispense products under centrifugal force.

It will be readily appreciated that the embodiments shown in FIGS. 1a, 1d and 1e could also be provided with one or more slack receiving containers as described with reference to FIGS. 1b or 1c above.

In summary, each of the dispersion feeders discussed above provide an efficient means of separating slack from a product stream containing a mixture of product and slack.

To illustrate this process further, FIG. 2 shows a section view of the dispersion feeder 10 of FIG. 1a in use.

A product stream containing both product P and slack S is provided to the product receiving region 14 at the centre of the dispersion table 12. The apertures 18 are sized relative to the product P and slack S, such that slack S may pass therethrough, but product P may not. For instance, the minimum dimension of each aperture 18 may be greater than the maximum dimension of the slack S, whereas the maximum dimension of each aperture 18 may be smaller than the minimum dimension of the product P.

As the product P falls onto the dispersion table 12 a significant amount of additional slack S may be created due to the impact of product P on the product supporting surface 12a. Without taking steps to remove it, this slack S could progress downstream and negatively impact machinery and output.

Once on the product supporting surface 12a, the product P and slack S spreads or disperses across the surface in substantially all directions, being transferred radially outwards from the product receiving region 14. This movement of product P and slack S may be under gravity and/or pressure from the following contents of the product stream. However, in further embodiments, the dispersion table 12 may be vibrated using table vibration means to disperse the product stream or controlled using alternative table drive means (as discussed above).

As the product P and slack S travels radially outwards it reaches the apertures 18. As the product stream passes over the apertures 18, slack S within the product stream falls through the apertures 18 whilst product P passes over the apertures 18 and continues travelling across the product supporting surface 12a. This is because the slack S is smaller than the apertures 18 whereas the product P which is larger in dimension than the apertures 18. Slack S passing through the apertures 18 may be collected in slack receiving containers (not shown). However this is not essential.

Subsequently, the product P continues to travel radially outwards to the product dispensing region 16. The product P will pass through the product dispensing region 16 and be dispensed from the periphery of the dispersion table 12.

Therefore, product P which is circumferentially dispensed by the dispersion feeder 10 is distributed substantially evenly around the edge of the dispersion feeder 10. Furthermore, the proportion of slack S in the product output from the dispersion feeder 10 is significantly reduced in comparison to the input product stream.

The dispensed product may subsequently be collected by receiving devices such as longitudinal troughs or hoppers (not shown in FIG. 2), and weighed, packaged or otherwise processed appropriately.

It should be noted that in practice small amounts of slack S may remain in the product stream output from the dispersion table 12. For instance, small amounts of slack may not encounter an aperture or be carried over the aperture by product P. However, this relatively small proportion of slack is not shown on in FIG. 2 for simplicity.

FIG. 3 shows a system comprising a dispersion feeder 50 which is used as an input to a multihead weigher 60 (although other downstream machinery is equally possible).

Furthermore, the system comprises longitudinal troughs 59 (i.e. receiving devices) arranged around the periphery of the dispersion feeder 50.

The dispersion feeder 50 comprises a circular dispersion table 52 having a cross section which is the same as to the dispersion table 42 shown in FIG. 1*d*.

In use the dispersion table 52 receives a single input product stream, separates slack from the product within the product stream via apertures 58, and distributes product between the longitudinal troughs 59. In turn the longitudinal troughs 59 transfer the product to hoppers 62 of the multi-head weigher 60 for weighing.

The dispersion feeder 50 further comprises a single annular slack receiving container 51 arranged to receive slack from each the apertures in the dispersion table 52. The slack receiving container 51 is a annular trough which extends circumferentially around a central axis $A_2$ of the dispersion feeder 50 under each aperture 58. The slack receiving container 51 comprises an extraction point 51*a* connected to a suction pump 55 (i.e. a vacuum pump) via suction tube 53. Slack which enters the slack receiving container 51 may be removed by operating the suction pump 55. These features share similar structure and purpose as the corresponding features of FIG. 1*c*.

The dispersion feeder 50 further comprises vibration means 57 attached to the dispersion table 52. The vibration means 57 is configured to vibrate the dispersion table 52 (thereby acting as a table vibration means), so as to shift or move product and slack supported thereon. For instance, circular and/or vertical vibration will cause product to move from the product receiving region to the product dispensing region. As such, the product and slack may be easily transferred from the product receiving region 54 to the product dispensing region 56.

Preferably the slack receiving container 51 is fixed or rigidly connected to the dispersion feeder 50. As such, the vibration means 57 will cause the dispersion table 52 and slack receiving container 51 to vibrate together as they are rigidly connected (i.e. the vibration means 57 is both table vibration means and container vibration means). This vibration will cause the slack to move within the slack receiving container 51, such that over time slack will travel to the extraction point 51*a* and be removed.

The additional energy required to vibrate the slack receiving container 51 is relatively small in comparison to the energy required to vibrate the larger and heavier dispersion table 52. As such, conducting the vibrations from a table vibration means to the slack receiving container 51 provides an efficient means of collecting slack.

Preferably vibration means 57 is configured to at least circumferentially vibrate the dispersion table 52 and the slack receiving container 51. As such a product stream on the dispersion table 52 will tend to move circumferentially about central axis $A_2$, thereby increasing the distance product and slack travel on the dispersion table and increasing the chance that any given piece of slack will encounter an aperture and be separated from the product. Furthermore, slack within the circular slack receiving container 51 will also move circumferentially about central axis $A_2$. As such, slack will be transferred quickly around the slack receiving container 51 to the extraction point 51*a* where it may be removed.

The vibration means 57 may be configured to circumferentially vibrate the dispersion table 52 and slack receiving container 51 where the frequency of vibration is in the range 10 to 100 Hz, more preferably 30 to 70 Hz. Additionally, or alternatively, the vibration means 57 may be configured to circumferentially vibrate the dispersion table 52 and slack receiving container 51 wherein the amplitude of the vibration at the periphery of the dispersion table is from 0.1 mm to 8 mm circumferentially and, preferably from 0.5 mm to 4 mm circumferentially. Additionally, or alternatively, the vibration means 57 may be configured to circumferentially vibrate the dispersion table 52 and slack receiving container 51 wherein the amplitude of vibration is from 0.1 degrees to 2 degrees angularly, and preferably from 0.2 degrees to 1 degree angularly.

In further examples the vibration means 57 could be replaced by, for instance, an alternative table drive means such a table rotation means. Equally, in some embodiments the vibration means 57 (or other table drive means) may be omitted and the product stream may travel across the dispersion table 52 under gravity.

FIGS. 4*a* to 4*e*, which show alternative embodiments of dispersion feeders 70 in a schematic plan view, illustrate different examples of suitable arrangements of apertures 78 (shown with hatching) and slack receiving containers 71 (shown in dashed lines) on dispersion tables 72. Equivalent features of subsequent figures are indicated by reference signs which include the appropriate letter.

Each dispersion table 72 is circular (although as discussed above, this is not essential). The dispersion tables 72 each comprise a product receiving region 74 at the centre of the dispersion table 72, and a product dispensing region 76 at or near the periphery of the dispersion table 72 which concentrically surrounds the product receiving region 74. Between the product receiving region 74 and the product dispensing region 76 are provided one or more apertures 78 which extend through the dispersion table 72. Under the aperture(s) 78 are arranged one or more slack receiving containers 71. The apertures 78 are each provided approximately halfway between the centre and the outer edge of their respective dispersion tables 72 (however, this is not essential).

In the preferable embodiments shown in FIGS. 4*a* to 4*e* apertures 78 are positioned to cover substantially all radial dimensions extending from the center of the dispersion tables 72 (i.e. product receiving regions 74). In other words, there is least one aperture along substantially all of the radial dimensions extending from each product receiving region 74. However, in other cases apertures may be provided in a dispersion table such that there is at least one aperture along at least 50% or 75% of the radial directions extending from the product receiving region of the dispersion table (i.e. such that apertures extend around half or three quarters of the product receiving region). Nevertheless, in each example the apertures extend through less than 50% of the total surface area of the dispersion tables 72

The dispersion feeder 70 of FIG. 4*a* comprises a dispersion table 72*a* with a single, annular aperture 78*a* and a single, annular slack receiving container 71*a* which each extend continuously around the product receiving region 74 of the dispersion table 72*a* (i.e. the aperture 78*a* and slack receiving container 71*a* surround the product receiving region 74). In other words, the annular aperture 78*a* is arranged at all radial directions extending from the product receiving region 78 at the centre of the dispersion table 72*a*. Consequently, a product stream travelling from the product receiving region 74*a* to the product dispensing region 76*a* across a surface of the dispensing table 72*a* must pass over the aperture 78*a*.

The slack receiving container 71*a* is provided below the aperture 78*a* such that the lateral extent of the slack receiving container 71*a* (i.e. the periphery of the slack receiving container in a radial plane) surrounds or encloses the lateral extent of the aperture 78a. Therefore, slack that enters substantially any part of the aperture will be received in the slack receiving container 71a.

FIG. 4b shows a dispersion feeder 72b having a dispersion table 72b which comprises four arc-shaped apertures 78b. The apertures 78b are arranged circumferentially around the dispersion table 72b such that their lateral extents define an annulus which surrounds the product receiving region 74b. The apertures 78b are spaced circumferentially such that the dispersion table 72b extends continually between the apertures 78b, e.g. to provide structural strength and connect the product receiving region 74b to the product dispensing region 74c.

As shown, the apertures 78b are located such that there is an aperture 78b at substantially all radial directions extending from the product receiving region 74a. By varying the length of the apertures 78b or the number of apertures 78b the proportion of radial directions along which an aperture 78b is provided may be varied.

The dispersion feeder 70b further comprises an annular slack receiving container 71b which extends circumferentially around the product receiving region 74b of the dispersion table 72b. The slack receiving container 71b is provided below the apertures 78b such that its lateral extent encompasses or surrounds all of the apertures 78b. Therefore, slack passing through any of the apertures 78b will be retained in the slack receiving container 71b.

The dispersion table 72c of the dispersion feeder 70c shown in FIG. 4c has a similar arrangement of apertures 78c as the dispersion table 72b of FIG. 4b. However, instead of a single, annular slack receiving container 71b (as in FIG. 4b) the dispersion feeder 70c comprises four slack receiving containers 71c.

The slack receiving containers 71c are arc-shaped. Each slack receiving container 71c is arranged below a corresponding aperture 71c such that the slack from each aperture 71c enters a corresponding slack receiving container 71c. The lateral extent or periphery of each slack receiving container 71c encloses the lateral extent or periphery of the respective aperture 78c.

FIG. 4d shows a dispersion feeder 70d with a dispersion table 72d that comprises eight arc-shaped apertures 78d arranged circumferentially around a product receiving region 74d at the centre of the dispersion table 72d. A surface of the dispersion table 72d extends continuously between the apertures 78d.

Therefore, as will be seen by comparing the figures, the proportion of radial directions extending from the product receiving region 74 (i.e. the centre of each dispersion table 72) in which there is at least one aperture 78, and therefore the proportion of slack which will be removed from a product stream, increases from FIG. 4d, to FIGS. 4b and 4c, and from FIGS. 4b and 4c to FIG. 4a.

The dispersion feeder 70d of FIG. 4d further comprises two slack receiving containers 71d. Each slack receiving container 71d is substantially semi-circular and extends underneath four apertures 78d such that each slack receiving container 71d will receive slack from the respective four apertures 78d. The lateral extent of each slack receiving container 71d encloses the lateral extents of the apertures 78c it is provided below.

Generally, it will be seen that the slack receiving containers 71c, 71d shown in FIGS. 4c and 4d are configured to receive slack from a subset of the apertures 78c, 78d extending through the respective dispersion tables 72c, 72d.

FIG. 4e shows a dispersion feeder 70e comprising a dispersion table 72e with apertures 78e, 78f at different radii from the centre of its product receiving region 74a (i.e. the centre of the circular dispersion table).

A first set of arc-shaped apertures 78e are arranged circumferentially between the product receiving region 74e and the product dispensing region 76e are located at a first radii $R_1$. A second set of arc-shaped apertures 78f are arranged circumferentially between the product receiving region 74e and the product dispensing region 76e are located at a second radii $R_2$. The second radii $R_2$ is greater than the first radii $R_1$ such that the second set of apertures 78f surround the first set of apertures 78e.

The dispersion table 72e extends continuously between the first and second sets of apertures 78e, 78f and between the apertures 78e, 78f within each set (e.g. to provide necessary structural strength and/or to connect the product receiving region 74e to the product dispensing region 76e).

Furthermore, the second set of apertures 78f are offset in a circumferential direction relative to the first set of apertures 78e such that at least one aperture 78e, 78f is located along all of the radial directions extending from the product receiving region 74e. Therefore, a product stream travelling radially outward from the product receiving region 74e will encounter at least one aperture 78e, 78f (thereby separating slack within the product stream) regardless of the radial direction of travel. Therefore, the dispersion feeder of FIG. 4e can remove relatively large amounts of slack from a product stream without reductions in structural strength.

A single, annular slack receiving container 71a extends continuously around the product receiving region 74 below the apertures 78e, 78f such that slack passing through all apertures 78e, 78f is received in the slack receiving container 71a. In other words, the lateral extent of the slack receiving container 71a (i.e. the periphery of the slack receiving container in a radial plane) surrounds or encloses the lateral extents of all apertures 78e, 78f.

It will be appreciated that the dispersion tables 72 shown in FIGS. 4a to 4e may form part of a dispersion feeder or system with any of the additional features discussed above with reference to FIGS. 1a to 3.

Figure 5A:
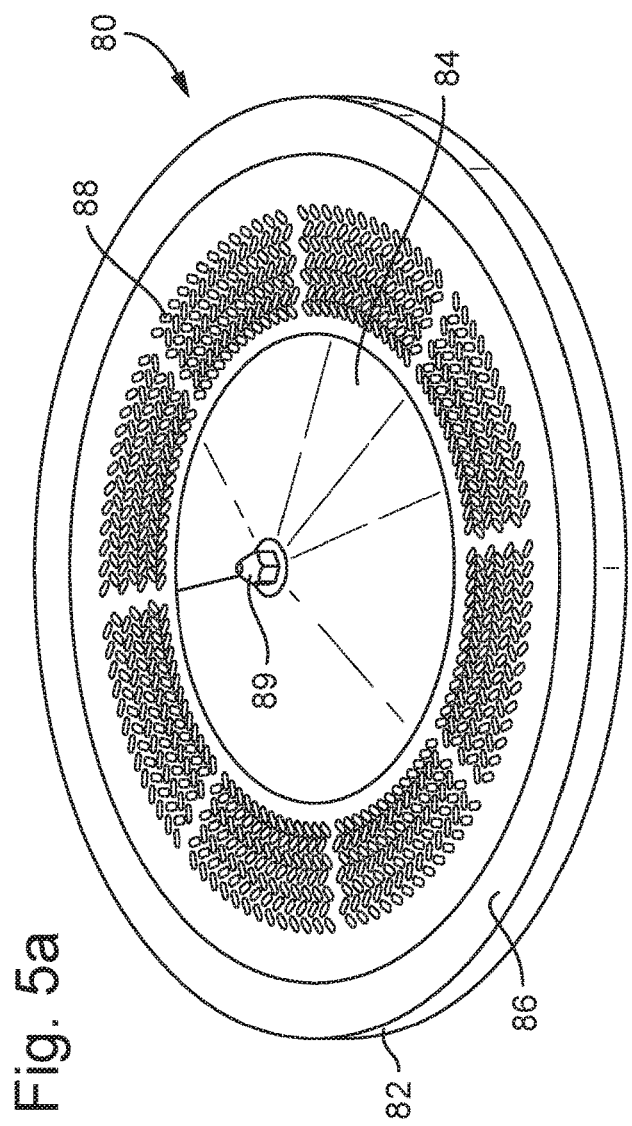
FIG. 5a shows a perspective view of an embodiment of a dispersion feeder in accordance with the invention.
Figure 5B:
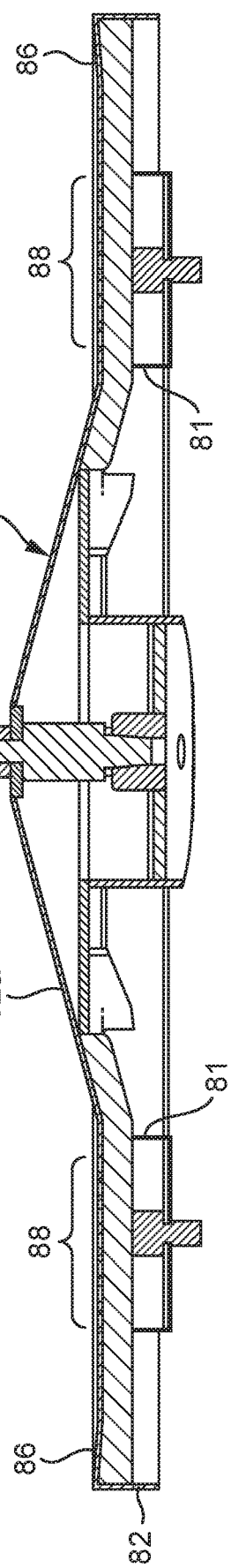
FIG. 5b shows a sectional view of this dispersion feeder.

FIGS. 5a and 5b show a further example of a dispersion feeder 80 suitable for separating slack from a product stream comprising a mixture of product and slack.

The dispersion feeder 80 comprises a circular dispersion table 82 having a product supporting surface 82a. The dispersion table comprises a central product receiving region 84, and a product dispensing region 86 at the periphery of the dispersion table 82. The product dispensing region 86 surrounds the product receiving region 86 concentrically. A plurality of apertures 88 which extend through the dispersion table 82 are provided in a herringbone pattern between the product receiving region 84 and the product dispensing region 86.

As a product stream comprising a mixture of product and slack disperses from the product receiving region 84 to the product dispensing region 86 slack may fall through the apertures 88. Therefore, slack may be removed from a product stream.

At the centre of the dispersion table 82 (i.e. in the product receiving region 84) the product supporting surface 82a is convex, having a conical shape. Therefore, product and slack in the product receiving region 84 will tend to be transferred radially outwards towards the product dispensing region 86.

The apertures 88 are arranged in an annular region of the table (i.e. such that the boundaries of the apertures 88 partially define an annulus extending around the centre of the dispersion table 80) in a portion of the product supporting surface 82*a* which is substantially parallel to a radial plane of the dispersion table 82 and is arranged to be substantially horizontal in use.

At the periphery of the dispersion table 82 the product supporting surface 82*a* comprises an inclined circumferential slope which slopes downwards from the radial edge of the product supporting surface 82*a* toward the apertures 88. Therefore, the edge of the product supporting surface 82 and the parts of the product dispersing region 86 are located higher than the portion of the dispersion table 82 in which the apertures 88 are provided. Slack which is not initially separated by the apertures 88 and reaches the product dispensing region 86 is less likely than product to travel up the inclined surface to the parts of the product dispensing region 86 which are higher the apertures 88 in order to dispensed from the dispersion table 82.

The relief of the product supporting surface 82*a*—having a conical central region at the central product receiving region 84, a substantially horizontal and planar surface in which apertures 88 are provided, and an inclined surface at the peripheral product dispensing region 86—increases the time slack will typically spend in the planar region with apertures 88 (i.e. the slack dwell time is increased). Therefore, the chance that slack is separated from a product stream is increased and the proportion of slack in the product stream output from the dispersion table 82 is reduced.

The dispersion feeder 80 shown in FIGS. 5*a* and 5*b* further comprises an annular slack receiving container 81 which extends circumferentially beneath the apertures 88 such that slack which is separated from a product stream by the apertures enters the slack receiving container 81. The slack receiving container 81 is rigidly fixed to the dispersion table 82 such that, if vibration is applied to the dispersion table 82, vibration is transmitted to the slack receiving container 81.

The dispersion feeder 80 further comprises attachment means 89 in the form of a central bolt extending through the dispersion table 82, which is suitable for mounting the dispersion feeder 80 to a vibration means and/or downstream machinery such as a multihead weigher. Such attachment means 89 may be provided to any of the dispersion tables discussed herein.

Figure 6:
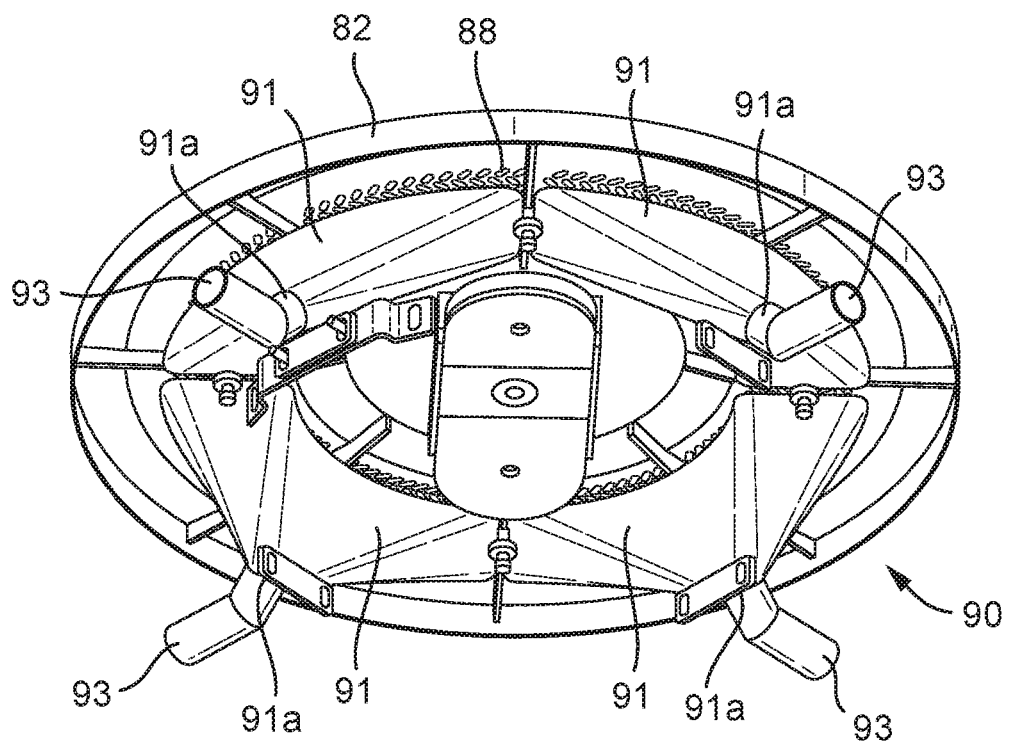
FIG. 6 shows a perspective view of a partially assembled system in accordance with an embodiment of the invention.

FIG. 6 shows a further dispersion feeder 90 which comprises the dispersion table 82 shown in FIGS. 5*a* and 5*b*. However, the dispersion feeder 90 comprises an alternative arrangement of slack receiving containers 91.

Specifically, the dispersion feeder comprises four slack receiving containers 91 arranged circumferentially below the apertures 88 through the dispersion table 82, such that each slack receiving container 88 may receive slack from a different subset of the apertures 88 in the dispersion table 82.

Each slack receiving container 91 comprises an extraction point 91*a* through which the respective slack receiving container 91 may be emptied. In the example shown in FIG. 6 each extraction point 91*a* is connected to a suction tube 93 through which a vacuum may be applied to remove slack from the respective slack receiving container 91, however this is not essential (for instance, slack may be removed manually if required).

To assist collection of slack the extraction point 91*a* of each slack receiving container is positioned at the lowest point of the respective slack receiving container 91*a*, and the base surface of each slack receiving container 91 slopes down to the respective extraction point 91*a*. Therefore, slack will tend collect towards the respective extraction point 91*a*. This movement of slack may occur naturally under gravity or under vibration from container vibration means (e.g. under circumferential vibration or under a combination of circumferential and vertical vibration).

Slack which drains toward the extraction points 91*a* may be easily collected and removed from the slack receiving containers 91 without the need to apply a significant vacuum to the extraction points 91*a* (or with some examples of slack, any vacuum). Therefore, the space and energy requirements for vacuum pump(s) connected to the extraction points 91*a* may be reduced or avoided.

Figure 7:
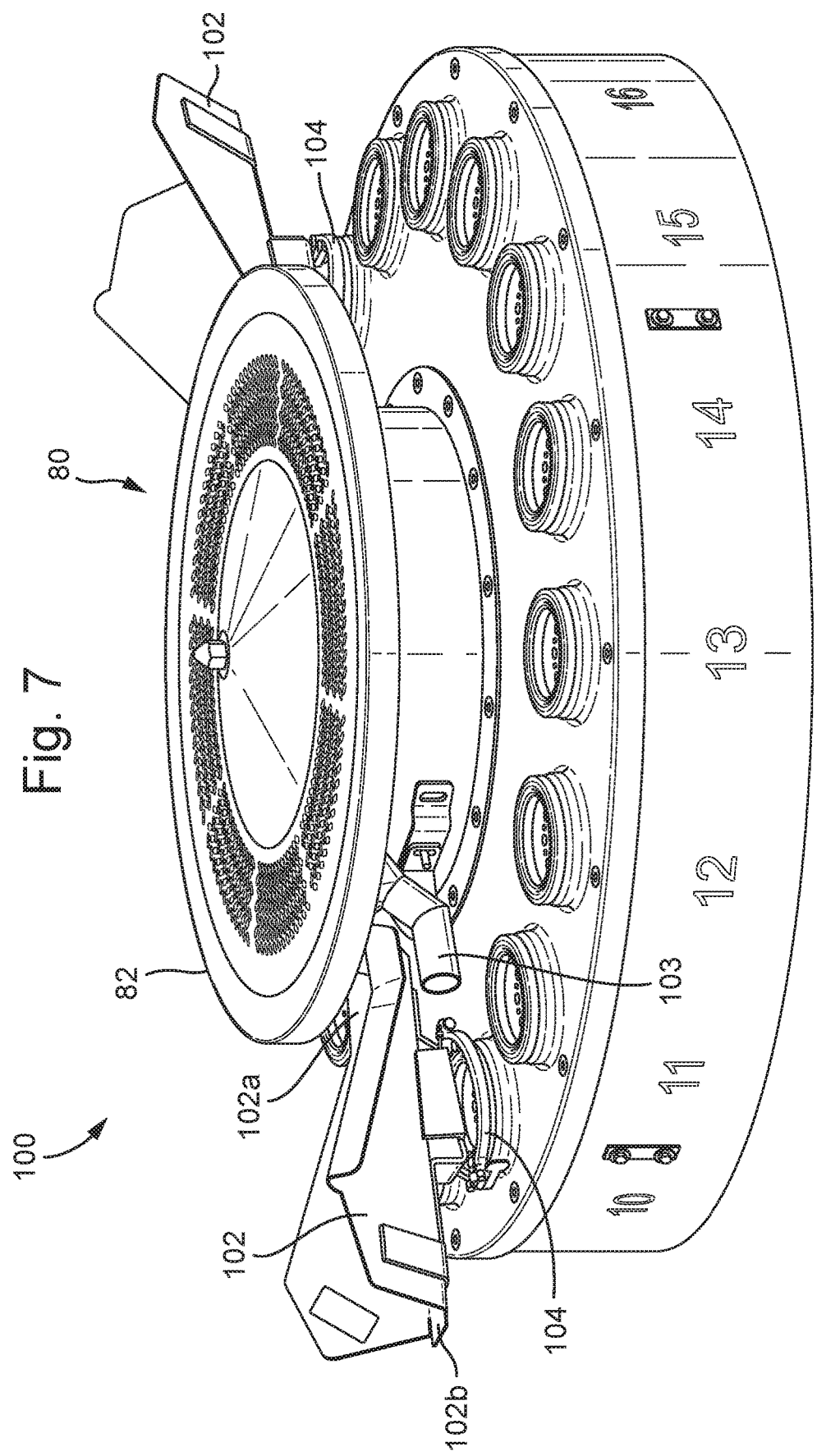
FIG. 7 shows the reverse perspective view of a dispersion feeder in accordance with an embodiment of the invention.

FIG. 7 shows a partially assembled system 100 comprising the dispersion feeder 80 and dispersion table 82 shown in FIGS. 5*a* and 5*b*.

The dispersion feeder 80 further comprises a suction tube 103 attached to an extraction point (not shown) within the slack receiving container 81 of FIGS. 5*a* and 5*b*. A vacuum may be applied to the slack receiving container 81 via this suction tube 103 to remove slack from within the slack receiving container 81. As will be seen, the system 100 comprises a single suction tube 103 that is configured to empty slack from the annular slack receiving container 81. This provides a particularly simple and space efficient means of collecting separated slack, especially where the slack receiving container 81 is vibrated in at least the circumferential direction (as discussed below with reference to FIG. 9*a*).

In addition the system comprises longitudinal troughs 102 arranged around the periphery of the dispersion table 82. Only two of the longitudinal troughs are shown in FIG. 6 for simplicity. When fully assembled eighteen longitudinal troughs 102 will be provided circumferentially around the periphery of the dispersion table 82.

The longitudinal troughs 102 will receive a product stream with reduced slack dispersed by the dispersion table 82 (i.e. the longitudinal troughs 102 act as receiving devices). An inward end portion 102*a* of the longitudinal troughs 102 is arranged below the outer edge of the dispersion table 82 to collect product which falls from the edge of the dispersion table 82 (i.e. from the product dispersing region 86 of FIGS. 5*a* and 5*b*).

The longitudinal troughs 102 are mounted on trough vibration means 104 such that vibration may be applied to the longitudinal troughs 102 to transfer product held therein from the radially inward end 102*a* to the radially outward end 102*b* of each longitudinal trough 102. At the radially outward end 102*b* of the longitudinal trough 102 product stream with reduced slack may then be dispensed (e.g. to hoppers of a multihead weigher or other downstream machinery which may be installed below the system 100 of FIG. 7).

It will be noted that not only do the devices, systems and methods discussed above significantly reduce slack which is output by a dispersion feeder, the novel features of the dispersion feeder do not prevent access to other components of the system. For instance, in FIG. 7 the longitudinal troughs 102, trough vibration means 104 or downstream machinery remain accessible for inspection and maintenance. Furthermore, the claimed system does not require significant additional space in comparison to traditional product handling systems.

Figure 8:
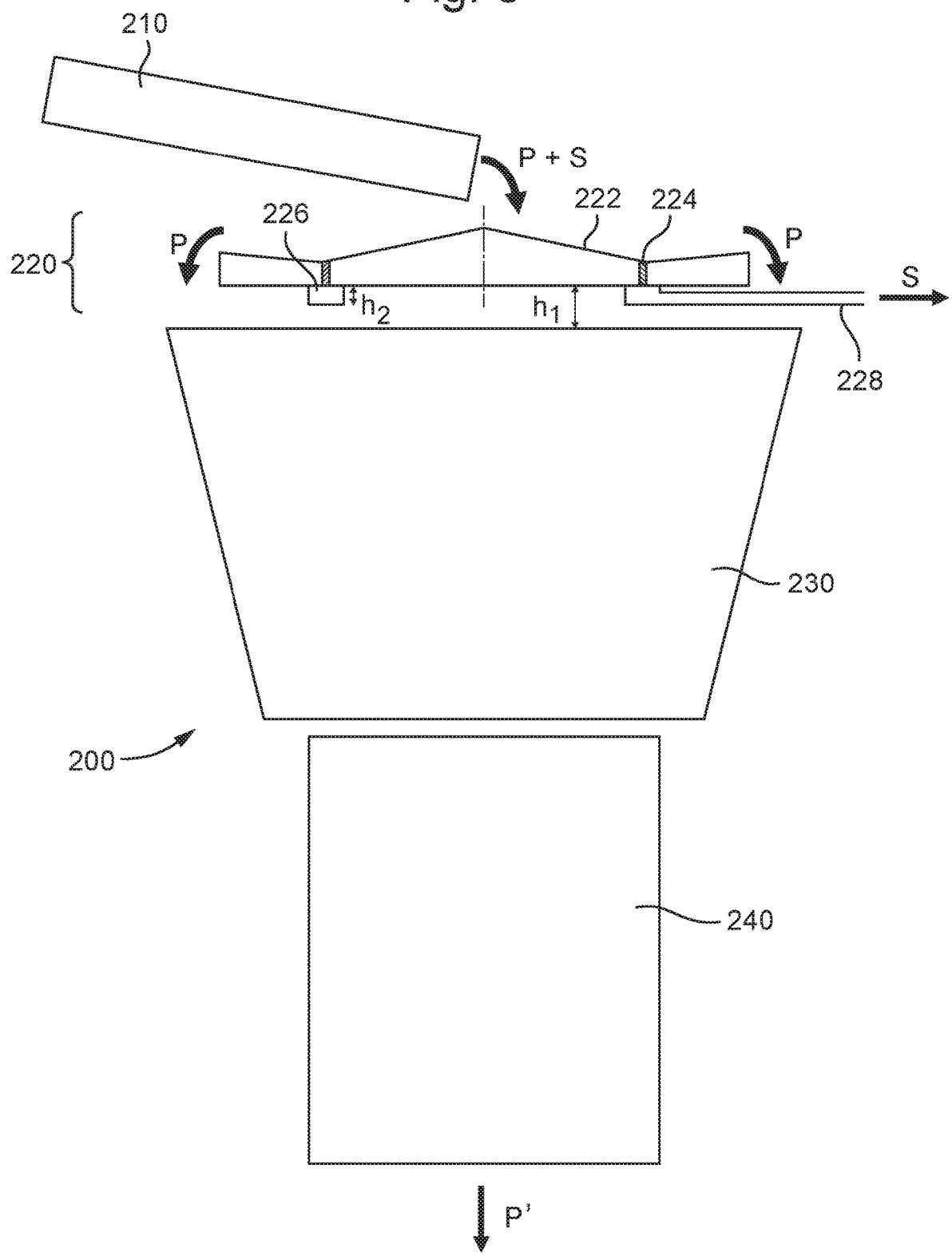
FIG. 8 shows schematically a system comprising a dispersion feeder in accordance with an embodiment of the invention.

FIG. 8 shows schematically a wider system 200 suitable for removing slack from a product stream that contains product and slack. The system 200 comprises a feed conveyor 210, a dispersion feeder 220, a weighing device 230 and a packaging machine 240. The flow of product and slack through this system will now be discussed in reference to the arrows P+S, P, S and P'. The dispersion feeder 220 feeds, and is installed over, the weighing device 230 and the packaging machine 240

In use, the feed conveyor 210 (which may be a conveyor such as a belt conveyor, vibratory conveyor or horizontal motion conveyor) supplies a mixture of product and slack to the dispersion feeder 220, as shown by arrow P+S.

The dispersion feeder 220 comprises a dispersion table 222, slack receiving container 226 and suction tube 228. The dispersion table 222 comprises similar features to the dispersion tables 40 and 52 discussed above with reference to FIGS. 1d and 3. In particular the dispersion table 222 shown in FIG. 8 comprises apertures 224 sized so that slack but not product may pass therethrough.

In use, a product stream containing product and slack from the feed device 222 introduced to the centre of the dispersion table 222 (i.e. the product receiving region) will move radially outwards towards the edges or periphery of the dispersion table 222 over the apertures 224. Slack which encounters these apertures 224 will be separated from the product stream and enter a slack receiving container 226 provided beneath the dispersion table 224. Slack is emptied from the slack receiving container under a vacuum applied by a vacuum pump (not shown) via suction tube 228, as shown by arrow S.

Whereas, product will pass over the apertures 224 and will be discharged or dispensed from a product dispensing region at the periphery of the dispersion table 222. Specifically, as shown by the arrows labelled P, the product discharged from the dispersion feeder 220 will fall to the weighing device 230. In some examples the product may be transferred to the weighing device 230 via longitudinal troughs such as those discussed with reference to FIG. 7.

The weighing device 230 (e.g. a computer controlled weigher) is configured to receive product from the overlying dispersion feeder 220 and divide the product into accurately sized portions and output these accurate product portions to the packaging machine 240. The packaging machine 240 (e.g. a bagmaker, cartoniser or traysealer) is configured to package the product and output a final packaged product, as shown by arrow P'.

The final packaged product P' output by the system 200 may contain significantly less slack than the product stream supplied to the dispersion feeder 220 by the feed device 210. In particular, the dispersion feeder 220 is successful at removing slack from the product stream shortly before the product is packaged.

In other words, the system 200 shown in FIG. 8—which comprises a slack separating dispersion feeder 220—may significantly improve the quality of a packaged product (e.g. a packaged food product) as it reaches a consumer. The dispersion feeder 220, which is located shortly upstream of the packaging machine 240, removes slack from a product stream shortly before the product is packaged thereby greatly reducing the amount of slack present inside the product packaging and reducing the incidence of defective seals caused by trapped slack.

However, significant amounts of slack may still be generated downstream of the dispersion feeder 220 between the removal of slack by the dispersion feeder 220 and the packaging process. For instance, the product may experience significant forces when it falls from the dispersion table 222 to the weighing device 230. These forces may damage the product (e.g. by dislodging loose product coating from the surface a coated product), creating additional slack.

The forces experienced by the product (and therefore the amount of additional slack created downstream of the dispersion feeder 220) may be reduced by reducing the distance that the product falls—i.e. by mounting the dispersion feeder 220 closer to the weighing device 230 (or another underlying downstream component) so as to minimise the distance $h_1$ between the dispersion table 222 (i.e. from the product dispensing region of the dispersion table 222) and the weighing device 230.

To minimise the distance hi between the dispersion able 222 and any downstream component it is desirable to reduce the height h2 of the slack receiving container 226 (i.e. the distance the slack receiving container 226 extends below the dispersion table 224) such that the dispersion feeder 220 may be mounted closer to the underlying downstream component. For instance, as shown in FIG. 8 the slack receiving container may be relatively shallow, comprising a horizontal base surface, and may be emptied periodically or continuously using a vacuum pump or container vibration means.

The benefits offered by circumferentially vibrating annular or arcuate slack receiving containers of a dispersion feeder will now be discussed further in relation to FIGS. 9a and 9b.

Figure 9A:
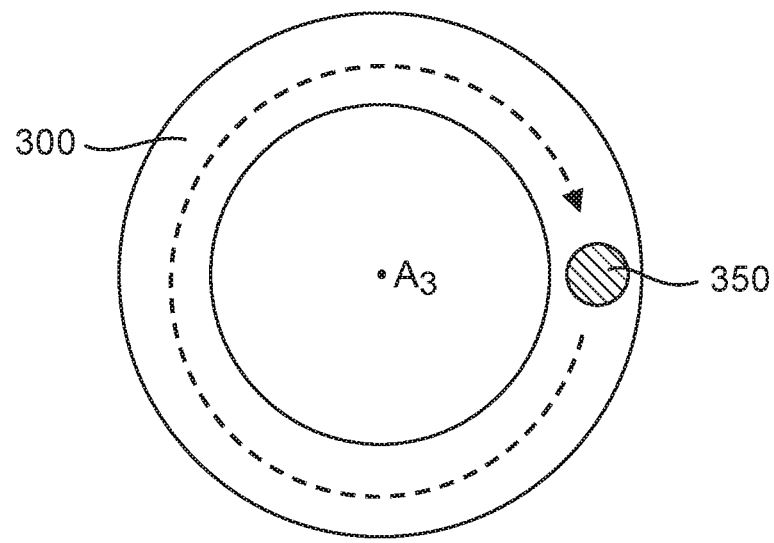
FIGS. 9a and 9b show a plan views of slack receiving containers suitable for use within dispersion feeders in accordance with an embodiment of the invention

FIG. 9a shows an annular slack receiving container 300 in plan view. As such the slack receiving container 300 extends circumferentially around and surrounds a centre axis $A_3$. This centre axis $A_3$ may be colinear with the centre axis of a dispersion table under which the slack receiving container 300 is mounted. The slack receiving container 300 comprises an extraction point 350 that extends through a base surface of the slack receiving container 300 and through which slack may be removed from the slack receiving container 300.

The slack receiving container 300 is configured to be at least circumferentially vibrated by a container vibration means (not shown). Specifically, the container vibration means (which may also be configured to vibrate an overlying dispersion table) is configured to circumferentially vibrate the slack receiving container 300 such that slack within the slack receiving container 300 will tend to move in a clockwise direction as shown by the dashed arrow (although the container vibration means could alternatively be configured such that slack will move in an ant-clockwise direction without affecting the performance of slack receiving container 300). Consequently, all slack which enters the slack receiving container 300—regardless of the position at which the slack enters the slack receiving container 300 and regardless of the circumferential position of the extraction point 350—will in use migrate in the clockwise direction around the annular slack receiving container 300 until it encounters the extraction point 350 from which the slack may be removed from the slack receiving container (e.g. by a vacuum pump, manually or under gravity).

Hence an annular slack receiving container 300, a single extraction point 350 and a container vibration means configured to vibrate the slack receiving container in at least a circumferential direction offers an elegant, simple and space efficient means of collecting slack separated from product stream using dispersion tables as discussed above.

Figure 9B:
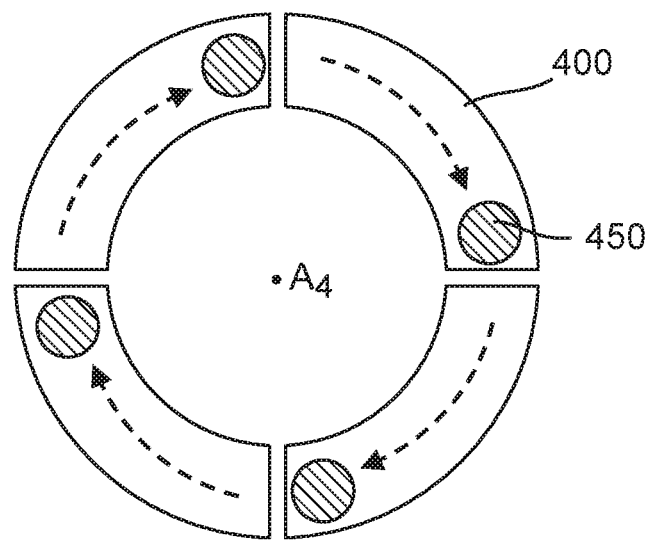

FIG. 9b shows four arcuate slack receiving containers 400 in plan view. The slack receiving containers 400 extend in a circumferential direction around a centre axis A4 (which again may be the centre axis of an overlying dispersion table). The arcuate slack receiving containers 400 each comprise a respective extraction point 450 through which slack may be removed.

The slack receiving containers 400 are configured to be at least circumferentially vibrated a container vibration means (not shown). Again, the container vibration means (which may also be configured to vibrate an overlying dispersion table) is configured to circumferentially vibrate the slack receiving containers 400 such that in use slack within each slack receiving container 400 will tend to move in a clockwise direction (as shown by the dashed arrows).

To remove the slack from each slack receiving container 400 the respective extraction point 450 is positioned at the end of the respective slack collection container 400 that is furthest in the clockwise direction—i.e. the at the end of the respective slack receiving container 400 which is furthest along the circumferential direction in which slack tends to move under the action of the container vibration means. Therefore, slack that enters the slack receiving containers 400 will tend to move in clockwise direction towards the respective extraction point 450. As such, a container vibration means configured to vibrate arcuate slack receiving containers 400 in a circumferential direction offers a simple means for automatically collecting slack that is separated from a product stream using a dispersion table (such as the dispersion tables discussed above). However, it should be noted that unlike in the annular example discussed above the position of the extraction points 450 and the direction in which the container vibration means causes slack to move around the slack receiving containers should correspond.

As discussed above, preferably the container vibration means (not shown) configured to drive the annular slack receiving container 300 of FIG. 9a and the arcuate slack receiving containers 400 of FIG. 9b are configured to simultaneously vertically and circumferentially vibrate the slack receiving containers 300, 400. Such a combination of vibrations provides a screwing or twisting motion that, in use, is particularly effective at conveying slack circumferentially along the slack receiving contains 300, 400.

The slack receiving containers 300, 400 shown in FIGS. 9a and 9b and the container vibration means configured to drive these slack receiving containers 300, 400 may be used in combination with a variety of the devices and systems previously discussed. Slack that is received in the slack receiving containers 300, 400 shown in FIGS. 9a and 9b is prevented from re-entering the downstream product stream and may be easily collected for recycling or reuse.

The invention claimed is:

1. A dispersion feeder for distributing a product stream to a plurality of receiving devices arranged about the periphery of the dispersion feeder, the dispersion feeder comprising a dispersion table;
    wherein the dispersion table comprises:
        a product receiving region at the centre of the dispersion table configured to receive a product stream comprising product and slack, and a product dispensing region surrounding the product receiving region;
        wherein the dispersion table is configured to transfer the product radially from the product receiving region to the product dispensing region;
        characterised in that the dispersion table further comprises:
    one or more apertures extending through the dispersion table, the one or more apertures being positioned between the product receiving region and the product dispensing region; and in that the dispersion feeder further comprises:
    one or more slack receiving containers arranged to receive slack which has passed through the one or more apertures, wherein at least one slack receiving container comprises an extraction point through which slack may be removed and a base surface inclined towards the extraction point such that slack is collected toward the extraction point.

2. The dispersion feeder of claim 1, further comprising a table driver.

3. The dispersion feeder of claim 2, wherein the table driver is a table vibrator configured to vibrate the dispersion table.

4. The dispersion feeder of claim 3, wherein the table vibrator is configured to vertically and/or circumferentially vibrate the dispersion table.

5. The dispersion feeder of claim 1, wherein the one or more apertures are located such that there is at least one aperture along at least half of the radial directions extending from the product receiving region to the product receiving region.

6. The dispersion feeder of claim 1, comprising:
    a single slack receiving container, wherein the periphery of the single slack receiving container extends around the peripheries of all of the one or more apertures; and/or
    a plurality of slack receiving containers each arranged to receive slack which has passed through a respective subset of the one or more apertures.

7. The dispersion feeder of claim 1, wherein the dispersion feeder further comprises a vacuum pump connected to the extraction point for removing slack from the at least one slack receiving container.

8. The dispersion feeder of claim 1, further comprising a container vibrator configured to vibrate the at least one slack receiving container so as to transfer slack contained therein to the extraction point.

9. The dispersion feeder of claim 8, wherein:
    the container vibrator is configured to vertically and/or circumferentially vibrate the slack receiving container; and/or the container vibrator is the table vibrator such that the at least one slack receiving container and the dispersion table vibrate together.

10. The dispersion feeder of claim 1, wherein at least one slack receiving container is rigidly connected to the dispersion table.

11. The dispersion feeder of claim 1, wherein the product receiving region is convex.

12. The dispersion feeder of claim 1, wherein at least part of the product dispensing region is higher than the region of the dispersion table in which the one or more apertures are located.

13. The dispersion feeder of claim 1, wherein the one or more apertures are sized such that slack but not product may pass therethrough.

14. The dispersion feeder of claim 1, wherein the minimum dimension of each of the one or more apertures is less than 0.5 cm.

15. A system comprising a dispersion feeder, and a plurality of receiving devices arranged about the periphery of the dispersion feeder;
    the dispersion feeder being configured to distribute a product stream to the plurality of receiving devices, the dispersion feeder comprising a dispersion table;
    wherein the dispersion table comprises:
        a product receiving region at the centre of the dispersion table configured to receive a product stream comprising product and slack, and a product dispensing region surrounding the product receiving region;

wherein the dispersion table is configured to transfer the product radially from the product receiving region to the product dispensing region;

characterised in that the dispersion table further comprises: one or more apertures extending through the dispersion table, the one or more apertures being positioned between the product receiving region and the product dispensing region and in that the dispersion feeder further comprises: one or more slack receiving containers arranged to receive slack which has passed through the one or more apertures, wherein at least one slack receiving container comprises an extraction point through which slack may be removed and a base surface inclined towards the extraction point such that slack is collected toward the extraction point.

16. The system of claim 15, wherein the receiving devices comprise one or more troughs and/or one or more hoppers.

17. The system of claim 15, wherein the system comprises a computer controlled weigher or volumetric feeder configured to receive product from the dispersion feeder.

18. A method of separating slack from a product stream comprising product and slack using a dispersion feeder according to claim 1, the method comprising:

providing the product stream to a product receiving region at the centre of a dispersion table;

controlling the dispersion table such that product is transferred radially from the product receiving region to a product dispensing region;

wherein the dispersion table further comprises one or more apertures extending through the dispersion table, the one or more apertures being positioned between the product receiving region and the product dispensing region, such that as the product stream is transferred over the apertures slack passes through the one or more apertures and is separated from the product stream.

19. The method of claim 18, wherein controlling the dispersion table comprises driving the dispersion table so as to cause the dispersion table to move.

20. The method of claim 18, wherein controlling the dispersion table comprises vibrating the dispersion table vertically and/or circumferentially.

21. The method of claim 18, wherein the dispersion table comprises at least one slack receiving container arranged to receive slack which has passed through the one or more apertures, and the method further comprises the step of removing slack from the slack receiving container.

22. The method according to claim 18, wherein removing slack from the slack receiving container comprises controlling a vacuum pump to remove slack from the slack receiving container; and/or the method further comprises the step of vibrating the slack receiving container vertically and/or circumferentially such that slack within the container is transferred towards an extraction point.

* * * * *